US012554902B2

(12) United States Patent
Brouillette et al.

(10) Patent No.: US 12,554,902 B2
(45) Date of Patent: Feb. 17, 2026

(54) SMART PHRASE GENERATOR TO INSTRUCT DIGITAL MANIKIN ACTION

(71) Applicant: Dassault Systemes Americas Corp., Waltham, MA (US)

(72) Inventors: David Brouillette, Saint-Lambert (CA); Julie Charland, Montreal (CA); Hugues Caron, Oakville (CA)

(73) Assignee: Dassault Systemes Americas Corp., Waltham, MA (US)

( * ) Notice: Subject to any disclaimer, the term of this patent is extended or adjusted under 35 U.S.C. 154(b) by 921 days.

(21) Appl. No.: 17/456,933

(22) Filed: Nov. 30, 2021

(65) Prior Publication Data
US 2023/0169225 A1     Jun. 1, 2023

(51) Int. Cl.
| | |
|---|---|
| *G06F 30/20* | (2020.01) |
| *G06F 11/34* | (2006.01) |
| *G06F 30/12* | (2020.01) |
| *G06F 30/15* | (2020.01) |
| *G06F 30/17* | (2020.01) |
| *G06F 9/48* | (2006.01) |
| *G06F 111/10* | (2020.01) |
| *G06F 119/18* | (2020.01) |

(52) U.S. Cl.
CPC .......... *G06F 30/20* (2020.01); *G06F 11/3457* (2013.01); *G06F 30/12* (2020.01); *G06F 9/4881* (2013.01); *G06F 2111/10* (2020.01); *G06F 2119/18* (2020.01)

(58) Field of Classification Search
None
See application file for complete search history.

(56) References Cited

U.S. PATENT DOCUMENTS

| | | | |
|---|---|---|---|
| 7,457,678 B2 | 11/2008 | Smith et al. | |
| 8,260,593 B2 | 9/2012 | Raschke | |
| 9,129,077 B2 | 9/2015 | Raschke | |
| 9,576,503 B2 | 2/2017 | Stephanian | |
| 10,576,625 B1 | 3/2020 | Stubbs et al. | |

(Continued)

FOREIGN PATENT DOCUMENTS

EP          3136346 A1     3/2017

OTHER PUBLICATIONS

Reed, Matthew P. et al. "The HUMOSIM Ergonomics Framework: A New Approach to Digital Human Simulation for Ergonomic Analysis." SAE Technical Papers (2006) (Year: 2006).*

(Continued)

*Primary Examiner* — Rehana Perveen
*Assistant Examiner* — Kyle H Tseng
(74) *Attorney, Agent, or Firm* — Hamilton, Brook, Smith & Reynolds, P.C.

(57) ABSTRACT

Embodiments determine manikin posture for simulations of real-world environments. An embodiment automatically generates a phrase by performing a hierarchical analysis using data regarding the real-world environment. According to an embodiment, the generated phrase describes a task, to be simulated, performed by a manikin in an environment. In turn, one or more posture engine inputs are determined based on the generated phrase. The posture for the manikin in a simulation of the manikin performing the task in the environment is then automatically determined based on the determined one or more posture engine inputs.

15 Claims, 17 Drawing Sheets

(56) References Cited

U.S. PATENT DOCUMENTS

| | | | |
|---|---|---|---|
| 10,607,413 | B1 | 3/2020 | Marcolina et al. |
| 11,548,145 | B2 | 1/2023 | Levine et al. |
| 11,620,416 | B2 | 4/2023 | Lemieux et al. |
| 11,654,564 | B2 | 5/2023 | Fan |
| 11,685,058 | B2 | 6/2023 | Yerazunis et al. |
| 11,775,699 | B2 | 10/2023 | Macloud et al. |
| 11,931,898 | B2 | 3/2024 | Berard et al. |
| 12,017,356 | B2 | 6/2024 | Fan et al. |
| 12,321,672 | B2 | 6/2025 | Zeighami et al. |
| 2005/0062738 | A1 | 3/2005 | Handley et al. |
| 2007/0013651 | A1 | 1/2007 | Depue et al. |
| 2008/0109271 | A1 | 5/2008 | Smith et al. |
| 2009/0173560 | A1 | 7/2009 | Nakamoto et al. |
| 2010/0256790 | A1 | 10/2010 | Teran-Matus et al. |
| 2012/0004774 | A1 | 1/2012 | Umetsu |
| 2013/0069936 | A1 | 3/2013 | Tsai et al. |
| 2014/0163731 | A1 | 6/2014 | Shi et al. |
| 2014/0371871 | A1 | 12/2014 | Farina et al. |
| 2016/0148132 | A1 | 5/2016 | Aqlan et al. |
| 2017/0061043 | A1 | 3/2017 | Lemieux et al. |
| 2017/0169138 | A1 | 6/2017 | Lemieux et al. |
| 2017/0235853 | A1 | 8/2017 | Griswold et al. |
| 2017/0344919 | A1 | 11/2017 | Chang et al. |
| 2019/0248003 | A1 | 8/2019 | Nagarajan et al. |
| 2019/0321974 | A1 | 10/2019 | Leon et al. |
| 2019/0366539 | A1 | 12/2019 | Arisoy et al. |
| 2020/0159716 | A1* | 5/2020 | Bates ................. G06F 16/23 |
| 2020/0316782 | A1 | 10/2020 | Chavez et al. |
| 2020/0349299 | A1 | 11/2020 | Macloud et al. |
| 2020/0349300 | A1 | 11/2020 | Lemieux et al. |
| 2020/0391385 | A1 | 12/2020 | Oka et al. |
| 2021/0031375 | A1 | 2/2021 | Drumwright et al. |
| 2021/0178591 | A1 | 6/2021 | Floyd-Jones et al. |
| 2021/0186792 | A1 | 6/2021 | Ewaldsson et al. |
| 2021/0232810 | A1 | 7/2021 | Parsa et al. |
| 2022/0092230 | A1 | 3/2022 | Callan et al. |
| 2022/0122009 | A1 | 4/2022 | Petterson et al. |
| 2022/0338928 | A1 | 10/2022 | Hammer et al. |
| 2022/0348409 | A1 | 11/2022 | Sun et al. |
| 2023/0021942 | A1 | 1/2023 | Zeighami et al. |
| 2023/0177228 | A1 | 6/2023 | Bourret et al. |
| 2023/0177437 | A1 | 6/2023 | Bourret et al. |
| 2023/0264349 | A1 | 8/2023 | Bourret et al. |
| 2024/0202463 | A1 | 6/2024 | Mazareinezhad et al. |

OTHER PUBLICATIONS

Tecnomatix, "Classic Jack: A premier human simulation tool for populating your design with virtual people and performing human factors and ergonomic analyses." Siemens, 2016 (Year: 2016).*

Kellenberger, Kathi, and Scott Shaw. Beginning T-SQL. 3rd ed. 2014. Berkeley, CA: Apress, 2014. Web. (Year: 2014).*

Reed, Matthew P., Miriam A. Manary, Carol AC Flannagan, and Lawrence W. Schneider. "Comparison of methods for predicting automobile driver posture." SAE transactions (2000): 2279-2290. (Year: 2000).*

Rosenbaum, David A., Ruud J. Meulenbroek, Jonathan Vaughan, and Chris Jansen. "Posture-based motion planning: applications to grasping." Psychological review 108, No. 4 (2001): 709. (Year: 2001).*

Diana, Giovanni. "Motion Capture Toolkit Development for Postural Assessment. Integration of Virtual Simulation tools for the Ergonomic Evaluation of Work tasks." PhD diss., Politecnico di Torino, 2021. (Year: 2021).*

Zheng, Weiguo, Hong Cheng, Lei Zou, Jeffrey Xu Yu, and Kangfei Zhao. "Natural language question/answering: Let users talk with the knowledge graph." In Proceedings of the 2017 ACM on Conference on Information and Knowledge Management, pp. 217-226. 2017. (Year: 2017).*

Myers, A., et al., "Affordance Detection of Tool Parts from Geometric Features," In International Conference on Robotics and Automation, pp. 1374-1381 (2015).

Myers, A., et al., "Affordance of Object Parts from Geometric Features," In International Conference on Robotics and Automation, pp. 1374-1381 (2015).

Namgung, I., "Path space approach for planning 2d shortest path based on elliptic workspace geometry mapping", KSME international Journal, 2004. 18(1): p. 92-105.

Nguyen, V.-D., "Constructing force-closure grasps," Int. Jour. Robotic Res, 7(3): 3-16 (1988).

Nguyen, V.-D., "Constructing stable grasps in 3D," in Robotics and Automation Proceedings. 1987 IEEE International Conference on, IEEE, 234-239 (1987).

Park, W., et al., "Toward memory-based human motion simulation: development and validation of a motion modification algorithm", IEEE transactions on systems, man, and cybernetics—Part A: Systems and Humans, 2004. 34 (3): p. 376-386.

Parkinson, M.B. and Reed, M.P., "Creating virtual user populations by analysis of anthropometric data," International Journal of Industrial Ergonomics, 40(1): 106-111 (2010).

Peinado, M., et al., "Full-body avatar control with environment awareness". IEEE Computer Graphics and Applications, 2009. 29(3): p. 62-75.

Perez, M.A., "Prediction of whole-body lifting kinematics using artificial neural networks", 2005, Virginia Tech.

Pettré, J., et al., "Planning human walk in virtual environments", in IEEE/RSJ International Conference on Intelligent Robots and Systems. 2002. IEEE.

Pettré, J., et al., "A 2-Stages Locomotion Planner for Digital Actors", Eurographics, SIGGRAPH Symposium on Computer Animation (2003).

Pitarch, E.P., et al., "SANTOS™ hand: a 25 degree-of-freedom model," SAE Technical Paper (2005).

Prabhakar, S. and M.R. Henderson, "Automatic form-feature recognition using neural-network-based techniques on boundary representations of solid models," Computer-Aided Design, 24: 381-393 (1992).

Reed, M.P., et al., "Methods for measuring and representing automobile occupant posture," SAE Technical Paper (1999).

Reed, M.P, et al., "The HUMOSIM Ergonomics Framework: A New Approach to Digital Human Simulation for Ergonomic Analysis", SAE Technical Papers, Jul. 2006.

Reed, M.P. and D.W. Wagner, "An integrated model of gait and transition stepping for simulation of industrial workcell tasks", SAE Transactions, 2007: p. 2062-2072.

Reed, M.P., et al., "Developing and implementing parametric human body shape models in ergonomics software," in Proceedings of the 3rd International Digital Human Modeling Conference. Tokyo, Japan (2014).

Roa, et al., "Grasp quality measures: review and performance," Autonomous robots, 38(1): 65-88 (2014).

Rouhi, R., et al., "A review on feature extraction techniques in face recognition," Signal & Image Processing, vol. 3, No. 6 (2012).

Russell, S., et al., "Artificial Intelligence A Modern Approach 3rd Edition" Pearson Education, Inc. 2010.

Ryan, P.W., Cockpit Geometry Evaluation. Volume V. Validation. 1969, Boeing Co Seattle WA Military Aircraft Systems Div.

Sahbani, A., et al., "An overview of 3D object grasp synthesis algorithms," Robotics and Autonomous Systems, 36 pages (2012).

Schmidt, P., et al., "Grasping of unknown objects using deep convolutional neural networks based on depth images," in: 2018 IEEE International Conference on Robotics and Automation (ICRA), IEEE, pp. 6831-6838 (2018).

Siciliano, B., et al., "Robotics - Modeling, Planning and Control", Advanced Texbooks in Control and Signal Processing (2009).

Svensson, S., et al., "Curve skeletonization of surface-like objects in 3D images guided by voxel classification," Pattern Recognition Letters, 23: 1419-1426 (2002).

Tay, S.C., et al., "In-vivo kinematic analysis of forearm rotation using helical axis analysis," Clinical Biomechanics, 25 (7): 655-659 (2010).

Vahrenkamp, N., et al., "Planning high-quality grasps using mean curvature object skeletons," IEEE Robotics and Automation Letters, 3: 911-918 (2017).

(56) References Cited

OTHER PUBLICATIONS

Wagner, D.W., et al., "Predicting foot positions for manual materials handling tasks", SAE transactions, 2005: p. 2872-2876.

Wu, G., et al., "ISB recommendation on definitions of joint coordinate system of various joints for the reporting of human joint motion-Part I: ankle, hip, and spine," Journal of biomechanics, 35(4): 543-548 (2002).

Wu, G., et al., "ISB recommendation on definitions of joint coordinate systems of various joints for the reporting of human joint motion—Part II: shoulder, elbow, wrist and hand," Journal of biomechanics, 38(5): 981-992 (2005).

Yamane, K., et al., "Synthesizing animations of human manipulation tasks," ACM Transactions on Graphics, 23(3) (2004).

Yang, L., et al. "Survey of Robot 3D Path Planning Algorithms", Journal of Control Science and Engineering, vol. 2016, Sril ID 7426913, 22 pages.

Zhang, X., et al., "Optimization-based differential kinematic modeling exhibits a velocity-control strategy for dynamic posture determination in seated reaching movements", Journal of Biomechanics 31 (1998) 1035-1042.

Zhang, Z., et al., "FeatureNet: Machining feature recognition based on 3D Convolution Neural Network," Computer-Aided Design, 101: 12-22 (2018).

Zhao, L., et al., "Applying Empirical Data on Upper Torso Movement to Real-time Collision-free Reach Tasks", SAE Technical Papers—Jun. 2005.

Zheng, Y., et al., "Ray-Shooting Algorithims for Robotics", Disney Research Pittsburgh, 2012.

Zhou, W. and M.P. Reed, "Validation of the human motion simulation framework: posture prediction for standing object transfer tasks," SAE Technical Paper (2009).

Cheze, L., et al., "Determination of the number of degrees of freedom of the trapeziometacarpal joint-an in vitro study," IRBM, 33(4):271-277 (2012).

Cornea, N.D., et al., "Curve-skeleton properties, applications, and algorithms," IEEE Transactions on Visualization & Computer Graphics, 20 pages (2007).

Bernard, B. P., et al., "Musculoskeletal Disorders and Workplace Factors", A Critical Review of Epidemiologic Evidence for Work-Related Musculoskeletal Disorders of the Neck, Upper Extremity, and Low Back, Jul. 1997, 590 pages.

Bevan, S., et al., "Economic impact of musculoskeletal disorders (MSDs) on work in Europe", Best Practice & Research Clinical Rheumatology, vol. 29 No. 3, Jun. 2015, pp. 356-373.

Colombini, D.. et al., "Risk Assessment and Management of Repetitive Movements and Exertions of Upper Limbs—Job Analysis, Ocra Risk Indices, Prevention Strategies and Design Principles," in Elsevier Ergonomics Book Series, vol. 2, eds., pp. 192 (2002).

De Magistris, G., et al., "Dynamic digital human models for ergonomic analysis based on humanoid robotics techniques", International Journal of the Digital Human, vol. 1, No. 1, Jan. 28, 2015, 30 pages.

Falck, A. C., et al., "The impact of poor assembly ergonomics on product quality: A cost-benefit analysis in car manufacturing", Human Factors and Ergonomics in Manufacturing & Service Industries, vol. 20, No. 1, 2010, pp. 24-41.

Hales, T. R., et al., "Epidemiology of Work-Related Musculoskeletal Disorders", Orthopedic Clinics of North America, vol. 27, No. 4, Oct. 1996, pp. 679-709.

Kazmierczak, K., et al., "A case study of serial-flow car disassembly: Ergonomics, productivity and potential system performance", Human Factors and Ergonomics in Manufacturing, vol. 17, No. 4, 2007, pp. 331-351.

Laring, J., et al., "ErgoSAM: A Preproduction Risk Identification Tool", Human Factors and Ergonomics in Manufacturing, vol. 15, No. 3, 2005, pp. 309-325.

Leigh, J. P., et al., "Economic Burden of Occupational Injury and Illness in the United States", The Milbank Quarterly, vol. 89. No. 4, 2011, pp. 728-772.

Ma, L., et al., "A Framework for Interactive Work Design based on Motion Tracking, Simulation, and Analysis", Human Factors and Ergonomics in Manufacturing, vol. 44, No. 4, Apr. 2010, pp. 339-352.

Neumann, W. P., et al., "Human Factors: Spanning the Gap between OM & HRM", Forthcoming in International Journal of Operations & Production Management, Jun. 4, 2010, 57 pages.

Schaub, K. G., et al., "Ergonomic assessment of automotive assembly tasks with digital human modelling and the 'ergonomics assessment worksheet' (EAWS)", International Journal of Human Factors Modelling and Simulation, vol. 3, No. 3-4, 2012, 29 pages.

Silverstein, B., et al., "Use of a prevention index to identify industries at high risk for work-related musculoskeletal disorders of the neck, back, and upper extremity in Washington state, 1990-1998", American Journal of Industrial Medicine, vol. 41, No. 149, 2002, pp. 149-169.

Wells, R., et al., "Time—A key issue for musculoskeletal health and manufacturing", Applied Ergonomics, vol. 38, No. 6, Nov. 2007, pp. 733-744.

Zandin, K. B., "Most (Registered) Work Measurement Systems", Third Edition, Revised and Expanded, 2003, 548 pages.

"Ergonomic Workplace Design", Dassault systems, 2002, 6 pages.

Agote-Garrido, A., et al., "Manufacturing System Design in Industry 5.0: Incorporating Sociotechnical Systems and Social Metabolism for Human-Centered, Sustainable, and Resilient Production.", Systems, vol. 11, Issue. 537, 2023, pp. 1-19.

Ahmed, S., et al., "Integrating human factors early in the design process using digital human modelling and surrogate modelling.", Journal of Engineering Design, vol. 32, Issue. 4, 2021, pp. 165-186.

Bahçivancilar U., "Validation of methods time measurement data," MS thesis. Middle East Technical University, 2012, 64 pages.

Baraldi. A.N., et al., "An introduction to modern missing data analyses," Journal of School Psychology, vol. 48, 2010, pp. 5-37.

Barnes. R.M., "Motion and time study: design and measurement of work," John Wiley & Sons, Seventh edition, 1991, 20 pages.

Beuss, F., et al., "Automated simulation-based design of ergonomic workstations using RPA and Human-in-the-Loop decision making.", Procedia CIRP, vol. 119, 2023, pp. 216-221.

Bland. J.M., et al., "Measuring agreement in method comparison studies," Statistical Methods in Medical Research, vol. 8, 1999, pp. 135-160.

Bland. J.M., et al., "Multiple significance tests: the Bonferroni method," BMJ, vol. 310, 1995, p. 170.

Bland. J.M., et al., "Statistical Methods for Assessing Agreement Between Two Methods of Clinical Measurement," Thelancet, vol. 8, 1985, 9 pages.

Borg, G., "Psychophysical scaling with applications in physical work and the perception of exertion.", Scandinavian journal of work, environment & health, vol. 16, Issue. 1, 1990, pp. 55-58.

Bures, M., et al., "Comparison of Time Standardization Methods on the Basis of Real Experiment", Procedia Engineering, vol. 100, 2015, pp. 466-474.

Bures. M., et al., "Comparison of the Predetermined Time Systems MTM-1 and BasicMOST in Assembly Production," IEEE, 2013, pp. 546-550.

Chaffin, D. B., "Improving digital human modelling for proactive ergonomics in design.", Ergonomics, vol. 48, Issue. 5, 2005, pp. 478-491.

Chaffin. D.B., "Occupational biomechanics—a basis for workplace design to prevent musculoskeletal injuries," Ergonomics, vol. 30, Issue 2, 1987, pp. 321-329.

Clark. L.D., et al., "Extending Fitts' law in three-dimensional virtual environments with current low-cost virtual reality technology," International Journal of Human-Computer Studies, vol. 139, 2020, 17 Pages.

Colombini, D., et al., "The revised OCRA Checklist method.", Editorial Factors Humans: Barcelona-Spain, 2013, pp. 1-60.

Crossman. E.R.F.W., et al., "Feedback control of hand-movement and Fitts' Law," Quarterly Journal of Experimental Psychology, vol. 35A, 1983, pp. 251-278.

(56) References Cited

OTHER PUBLICATIONS

Da Silva, A. G., et al., "Virtual reality and digital human modeling for ergonomic assessment in industrial product development: a patent and literature review.", Applied Sciences, vol. 12, Issue. 3, 2022, pp. 1-24.

Dahibhate, G., et al., "The use of digital human modeling in ergonomic design and product development.", Journal of The Institution of Engineers, vol. 104, Issue. 5, 2023, pp. 1133-1138.

De Magistris, G., et al., "Dynamic control of DHM for ergonomic assessments.", International Journal of Industrial Ergonomics, vol. 43, Issue. 2, 2013, pp. 170-180.

Emir, T., et al., "Computer-Assisted Ergonomic Analysis of Working Postures Causing Strain.", European Journal of Forest Engineering, vol. 8, Issue. 2, 2022, pp. 66-76.

Faber. G.S. et al., "Working height, block mass and one- vs. twohanded block handling: the contribution to low back and shoulder loading during masonry work," Ergonomics, vol. 52, No. 9, Sep. 2009, pp. 1104-1118.

Fitts. P.M. et al., "The Information Capacity of the Human Motor System in Controlling the Amplitude of Movement," Journal of Experimental Psychology, vol. 47, No. 6, Jun. 1954, pp. 381-391.

Frost. J., "How To Interpret R-squared in Regression Analysis," 2021, 8 pages.

Genaidy. A.M., et al., "The Validity of Predetermined Motion Time Systems in Setting Production Standards for Industrial Tasks," International Journal of Industrial Ergonomics, vol. 3, 1989, pp. 249-263.

Ghorbani, E., et al., "Ergonomic Assembly Line Balancing Problems Evolution and Future Trends with Insights into Industry 5.0 Paradigm.", Université de Montreal, Jul. 16, 2023, 34 pages.

Ghorbani, E., et al., "Fuzzy Ergonomic Expert System for Assembly Line Design Problem.", Accessibility, Assistive Technology and Digital Environments, vol. 121, 2024, pp. 250-260.

Ghorbani, E., et al., "Fuzzy expert system for ergonomic assembly line worker assignment and balancing problem under uncertainty", Journal of Industrial and Production Engineering, Aug. 16, 2024, 24 pages.

Ghorbani, E., et al., "Fuzzy fatigue model for ergonomic design of assembly lines under uncertainty.", Intelligent Systems Conference, 2024, pp. 392-407.

Ghorbani, E., et al., "Optimization Framework for Assembly Line Design Problem with Ergonomics Consideration in Fuzzy Environment", IFIP Advances in Information and Communication Technology, vol. 702, Jun. 28, 2024, 11 pages.

Hamilton, B. CS, et al., "Artificial intelligence based real-time video ergonomic assessment and training improves resident ergonomics.", The American Journal of Surgery, vol. 226, Issue. 5, 2023, pp. 741-746.

Harari, Y. et al., "Factors determining workers' pace while conducting continuous sequential lifting, carrying, and lowering tasks," Applied ergonomics, vol. 67, 2018, pp. 61-70.

International Organization for Standardization. Safety of Machinery: Anthropometric Requirements for the Design of Workstations at Machinery, ISO, First edition, 2002, 37 pages.

JMP, "Statistical Software for Insight-Driven Improvement Seeing is understanding.", JMP software combines interactive visualization with powerful statistics., 2024, 4 pages.

Karger, D W. et al., "Engineered work measurement: the principles, techniques, and data of methods-time measurement background and foundations of work measurement and methods-time measurement, plus other related material," Industrial Press Inc., Chapter 3, 1987, pp. 37-51.

Karhu, O., et al., "Correcting working postures in industry: A practical method for analysis.", Applied ergonomics, vol. 8, Issue. 4, 1977, pp. 199-201.

Khamaisi, R. K., et al., "An innovative integrated solution to support digital postural assessment using the TACOs methodology. ", Computers & Industrial Engineering, vol. 194, 2024, pp. 1-14.

Kodak's ergonomic design for people at work, The Eastman Kodak Company, Second edition, 2003, 723 pages.

Kulac, S., et al., "An integrated ergonomic risk assessment framework based on fuzzy logic and IVSF-AHP for optimising ergonomic risks in a mixed-model assembly line.", Ergonomics, 2024, pp. 1-22.

Kurkin. O., et al., "Evaluation of operational times by MTM methods in the digital factory environment," Annals of DAAAM for 2011 & Proceedings of the 22nd International DAAAM Symposium, vol. 22, No. 1, 2011, pp. 0671-0672.

Lavatelli, I., et al., "Correlations in between EAWS and OCRA Index concerning the repetitive loads of the upper limbs in automobile manufacturing industries.", Work, vol. 41, 2012, pp. 4436-4444.

Li, X., et al., "An improved physical demand analysis framework based on ergonomic risk assessment tools for the manufacturing industry.", International journal of industrial ergonomics, vol. 70, 2019, pp. 58-69.

Mackenzie, I.S., "Movement Time Prediction in Human-Computer Interfaces," Readings in human-computer interaction, 1995, pp. 483-493.

MacKenzie. I.S., "Fitts' law as a research and design tool in human-computer interaction," Human-computer interaction, vol. 7, 1992, pp. 91-139.

MacKenzie. I.S., "Fitts' Law," The wiley handbook of human computer interaction, vol. 1, 2018, pp. 347-370.

MacKenzie. I.S., et al., "Extending Fitts' Law To Two-Dimensional Tasks," Proceedings of the SIGCHI conference on Human factors in computing systems, 1992, pp. 219-226.

Manghisi, V. M., et al., "A virtual reality approach for assisting sustainable human-centered ergonomic design: the ErgoVR tool.", Procedia Computer Science, vol. 200, 2022, pp. 1338-1346.

Massiris Fernandez, M., et al., "Ergonomic risk assessment based on computer vision and machine learning.", Computers & Industrial Engineering, vol. 149, 2020, 11 pages.

Mazareinezhad, F., et al., "Evaluating the Accuracy of the MOST Predetermined Motion Time System Through Lab Experiments," Human Aspects of Advanced Manufacturing, Production Management and Process Control, vol. 146, 2024, pp. 116-122.

Cort, J.A. and Devries, D., "Accuracy of Postures Predicted Using a Digital Human Model During Four Manual Exertion Tasks, and Implications for Ergonomic Assessments", IISE Transactions on Occupational Ergonomics and Human Factors, 7:43-58 (2019).

Hogberg, D., et al., "IMMA—Intelligently Moving Manikins in Automotive Applications", Third International Summit on Human Simulation (ISHS2014) 2014.

Baerlocher, P., "Inverse kinematics techniques of he interactive posture control of articulated figures", [Ph. D. thesis]. Ecole Polytechnique Federale de Lausanne (EPFL)Stephens A, Jones M. Workplace methods and use of digital human models. Handbook of Digital Human Modeling, USA: Taylor and Francis. 2009:6.1-6.11.

Emieux, Pierre-Olivier, et al., "Degrees of freedom coupling adapted to the upper limb of a digital human model", International Journal of Human Factors Modelling and Simulation. 2017; 5(4):314-37.

Lemieux, Pierre-Olivier, et al., "A visual acuity constraint for digital human modeling", Conference proceedings 4th. 2016.

Zeighami, A., et al., "Stepping behavior for stability control of a digital human model", AISB/ASB 2019.

Bourret, Q., et al., "Ergo4All: An Ergonomic Guidance Tool for Non-ergonomist", In: Black N.L., Neumann W.P., Noy I. (eds) Proceedings of the 21st Congress of the International Ergonomics Association (IEA 2021). IEA 2021.

Perez, J., et al., "Ergonomists' and Engineers' Views on the Utility of Virtual Human Factors Tools", Human Factors and Ergonomics in Manufacturing & Services Industries, 25 (3) 279-293 (2015).

Goussous, et al. "A New Methodology for Human Grasp Predication" IEEE Transactions on Systems, Man, and Cybernetics—Part A: Systems and Humans, vol. 39, No. 2, Mar. 2009 (Year: 2009).

Al-Masri, et al. "Human-Like Motion Based on a Geometrical Inverse Kiematics and Energetic Optimization" 2008 IEEE/RSJ International Conference on Intelligent Robots and Systems (Year: 2008).

Leon, et al. "From Robot to Human Grasping Simulation" 2014, Springer, Cognitive Systems Monographs vol. 19 (Year: 2014).

(56) References Cited

OTHER PUBLICATIONS

Johns, et al. "Deep Learning a Grasp Function for Grasping under Gripper Pose Uncertainty" 2016 IEEE/RSJ International Conference on Intelligent Robots and Systems (IROS) (Year: 2016).
Badler, Norman I., et al., "Animation control for real-time virtual humans." Communications of the ACM 42.8 (1999): 64-73.
Bekey, George A., et al. "Knowledge-based control of grasping in robot hands using heuristics from human motor skills." IEEE Transactions on Robotics and Automation 9.6 (1993): 709-722.
Blanchonette, P., "Jack Human Modelling Tool: A Review", Australian Government Deparment of Defense, Defense Science and Technology Organisation Technical Report, DSTO-TR-2364, AR-014-672, Jan. 2010, Victoria, Australia.
Bourret, Q., et al. "Flexible hand posture for tools grasping." DHM (2019).
Bourret, Q., et al., "Grasp Planning of Unknown Object For Digital Human Model", 13th International Conference on Applied Human Factors and Ergonomics.
Duffy, V.G., "Handbook of Digital Human Modeling: Research for Applied Ergonomics and Human Factors Engineering (1st ed.)". Chapter 2.4 (2008).
Ergonomics Specialist—Dassault Systèmes, "Human-Centered Prodcut and Workplace Design with Virtual Ergonomics", https://www.3ds.com/products-services/delmia/disciplines/industrial-engineering/tag/88-1007/. Downloaded from Internet Jan. 11, 2023.
European Committee for Standardization, EN 1005-2. Safety of machinery—Human physical performance. Part 2: Manual handling of machinery and component parts of machinery. Brussels, European Committee for Standardization (2003).
European Committee for Standardization, EN 1005-3:2002+ A1:2008, "Safety of machinery—Human physical performance—Part 3: Recommended force limits for machinery operation", Oct. 2008.
European Committee for Standardization, EN 1005-4:2002+ A1:2008, "Safety of machinery—Human physical performance—Part 4: Evaluation of working postures and movements in relation to machinery", Oct. 2008.
Feix, T., et al., "Analysis of human grasping behavior: Object characteristics and grasp type." IEEE transactions on haptics 7.3 (2014): 311-323.
Gallagher, S. and M.C. Schall Jr, "Musculoskeletal disorders as a fatigue failure process: evidence, implications and research needs," Ergonomics, 60(2): 255-269 (2016).
Hignett et al., Practical Ergonomics, REBA Employee Assessment Worksheet, 1 page, based on Technical note: Rapid Entire Body Assessment (REBA), Hignett, McAtamne, Applied Egonomics, 31(2): 201-205 (2000).
Hignett, S., & McAtamney, L., "Rapid entire body assessment (REBA)", Applied Ergonomics, 31(2), 201-205 (2000).
Human Factors Engineering, "The next generation of human modeling and simulation begins when you're ready," Virtual Soldier Research, 8 pages (2004).
International Labour Office in collaboration with the International Ergonomics Association, Ergonomic Checkpoints: Practical and Easy-To-Implement Solutions for Improving Safety, Health, and Working Conditions, Second Edition, 2010, Geneva, Switzerland.
International Organization for Standardization, ISO 11226:2000, "Ergonomics—Evaluation of static working postures" Technical Corrigendum 1, 2000, Geneva, Switzerland.
International Organization for Standardization, ISO 11228-3:2007, "Ergonomics—Manual handling—part 3: Handling of low loads at high frequency", 2007, Geneva, Switzerland.
International Organization for Standardization, ISO 14738:2002, "Safety of machinery—Anthropometric requirements for the design of workstations at machinery", p. 12, Sep. 2002, Geneva, Switzerland.
Macloud, A., et al. "Extracting grasping cues from pistol-shaped tools for digital human models." Computer-Aided Design and Applications 18.6 (2021): 1167-1185.
McAtamney, L., et al., "RULA: a survey method for the investigation of work-related upper limb disorders", Applied Ergonomics, pp. 91-99, vol. 24, No. 2, Apr. 1993.
Mital, A .: Guide to Manual Materials Handling. CRC Press, Boca Raton (1997).
Salvendy, G., Handbook of Human Factors and Ergonomics, Fourth Edition, 2012, John Wiley & Sons, Inc., Hoboken, New Jersey.
Santoshuman, Inc., "PredictiveHuman Model", https://www.santoshumaninc.com; (8 pages) downloaded from Internet Jan. 11, 2023.
Stephens, A., and M. L. H. Jones. "Workplace methods and use of digital human models." Handbook of Digital Human Modeling, USA: Taylor and Francis 6 (2009): 1-6.
Waters, Thomas R., et al., "Revised NIOSH equation for the design and evaluation of manual lifting tasks", Ergonomics, pp. 749-776, vol. 26, No. 7, 1993.
Zhou, Wei, et al. "Simulating complex automotive assembly tasks using the HUMOSIM framework", No. 2009-01-2279. SAE Technical Paper, 2009.
Abdel-Malek, K., et al., "Santos: An integrated human modeling and simulation platform, in DHM and Posturography". 2019, Elsevier. p. 63-77.
Abdel-Malek, K., et al., "Towards a new generation of virtual humans. International Journal of Human Factors Modelling and Simulation", 2006. 1(1): p. 2-39.
Afyouni, I, et al. "Spatial models for context-aware indoor navigation systems: A survey", Journal of Spatial Information Science, 2012, 1 (4), pp. 85-123.
Au, O.K.-C., et al., "Skeleton extraction by mesh contraction," in: ACM transactions on graphics, vol. 27, No. 3, article 44, (2008).
Baerlocher, P. and R. Boulic, An inverse kinematic architecture enforcing an arbitrary number of strict priority levels. The visual computer, 2004. 20(6): p. 402-417.
Bataineh, M., et al. "Neural network for dynamic human motion prediction", Science Direct, Expert Systems with Applications, 48 (2015) 26-34.
Bhatia, N., et al., "Modeling visually guided hand reach for Digital Human Models", Science Direct, 6th Internatioanl Conference on Applied Human Factors and Ergonomics (WHFE 2015) and the Affiliated Conferences, AHFE 2015, Procedia Manufacturing 3 (2015) 3820-3827.
Bjorkenstam, S., et al., "Enhancing digital human motion planning of assembly tasks through dynamics and optimal control", Science Direct, Procedia CIRP, 2016. 44: p. 20-25.
Berscheid, L., et al., "Improving Data Efficiency of Self-supervised Learning for Robotic Grasping," arXiv preprint arXiv:1903.00228, (2019).
Bohg, J. and D. Kragic, "Learning grasping points with shape context," Robotics and Autonomous Systems, vol. 58, No. 4, pp. 362-377 (2009).
Bohg, J., et al., "Data-driven grasp synthesis—a survey," IEEE Transactions on Robotics, 30(2), 289-309 (2014).
Burns, E., et al., "The hand is more easily fooled than the eye: Users are more sensitive to visual interpenetration than to visual-proprioceptive discrepancy". Presence: teleoperators & virtual environments, 2006. 15(1): p. 1-15.
Buss, S.R. and Kim, J .- S., "Selectively damped least squares for inverse kinematics," Journal of Graphics tools, 10(3). 37-49 (2004).
Chaffin, D.B., "Digital Human Modeling for Workspace Design", Reviews of Human Factors and Ergonomics, Dec. 2008.
Chaffin, D.B., "Human motion simulation for vehicle and workplace design", Human Factors and Ergonomics in Manufacturing & Service Industries, 2007. 17(5): p. 475-484.
Cutkosky, M.R. and R.D. Howe, "Human Grasp Choice and Robotic Grasp Analysis," In Dextrous Robot Hands, Springer-Verlag, pp. 5-31 (1990).
Cutkosky, M.R., "On grasp choice, grasp models, and the design of hands for manufacturing tasks," IEEE Transactions on robotics and automation, 5(3): 269-279 (1989).
Diaz, C., et al., "Grasping points for handle objects in a cooperative disassembly system," IFAC Proceedings vols. 40: 126-131 (2007).
Diffrient et al., "Humanscale 7/8/9," 1982, The MIT Press.

(56) References Cited

OTHER PUBLICATIONS

Ekvall, S. and Kragic, D., "Interactive grasp learning based on human demonstration," in Robotics and Automation, Proceedings. ICRA'04. 2004 IEEE International Conference on, IEEE, 3519-3524 (2004).

El-Khoury, S. and A. Sahbani, "A new strategy combining empirical and analytical approaches for grasping unknown 3D objects," Robotics and Autonomous Systems, 34 pages (2009).

El-Khoury, S., "Approche Mixte, Analytique et par Apprentissage, pour la Synthèse d'une Prise Naturelle" (Thesis, Pierre et Marie Curie University, Paris, France, 2008).

Endo, Y., et al., "An application of a digital hand to ergonomic assessment of handheld information appliances," SAE Technical Paper (2006).

Endo, Y., et al., "A computer-aided ergonomic assessment and product design system using digital hands," in International Conference on Digital Human Modeling, Springer, 833-842 (2007).

Endo, Y., et al., "Virtual grasping assessment using 3D digital hand model," in Annual Applied Ergonomics Conference: Celebrating the Past-Shaping the Future (2007).

Endo, Y., et al., "Optimization-based grasp posture generation method of digital hand for virtual ergonomics assessment," SAE international journal of passenger cars-electronic and electrical systems, 1 (2008-01-1902). 590-598 (2009).

Faraway, J.J., "Regression analysis for a functional response. Technometrics," 1997. 39(3): p. 254-261.

Feix, T., et al., "The grasp taxonomy of human grasp types," IEEE Transactions on Human-Machine Systems, 46(1): 66-77 (2016).

Feyen, R., et al., "Computer-aided ergonomics: a case study of incorporating ergonomics analyses into workplace design". Applied ergonomics, 2000. 31(3): p. 291-300.

Fischer, M., et al., "Learning techniques in a dataglove based telemanipulation system for the DLR hand," in Robotics and Automation, Proceedings. 1998 IEEE International Conference on, (1998), IEEE, 1603-1608 (1998).

Frazzoli, E., et al. "Algorithmic Foundations for Robotics X", Proceedings of the Tenth Workshop on the Algorithmic Foundations of Robotics, 2013.

Gibson, James, J., "The Theory of Affordances," The Ecological Approach to Visual Perception (1979).

Goussous, F. A., "Grasp Planning for digital humans," Thesis, University of Iowa, 87 pages (2007).

Holleman, C. and L.E. Kavraki, "A framework for using the workspace medial axis in PRM planners," in: Proceedings 2000 ICRA. Millennium Conference. IEEE International Conference on Robotics and Automation. Symposia Proceedings (Cat. No. 00CH37065), IEEE, pp. 1408-1413 (2000).

Huang, J. and C.-H. Menq, "Automatic data segmentation for geometric feature extraction from unorganized 3-D coordinate points," IEEE Transactions on Robotics and Automation, vol. 17, No. 3, pp. 268-279 (2001).

Hueser, M., et al., "Learning of demonstrated grasping skills by stereoscopic tracking of human head configuration," in Robotics and Automation, ICRA 2006. Proceedings 2006 IEEE International Conference on, IEEE, 2795-2800 (2006).

Jung, E.S. and J. Choe, "Human reach posture prediction based on psychophysical discomfort," International Journal of Industrial Ergonomics, 1996. 18(2-3): p. 173-179.

Jung, E.S., et al., "Upper body reach posture prediction for ergonomic evaluation models". International Journal of Industrial Ergonomics, 1995. 16(2): p. 95-107. (Science Direct).

Kyota, F., et al., "Detection and evaluation of grasping positions for autonomous agents," In International Conference on Cyberworlds, 9 pages (2005).

LaValle, S.M., et al. "Randomized Kinodynamic Planning", The International Journal of Robotics Research, vol. 20, No. 5, May 5, 2001, pp. 378-400.

Lehericey, F., "Iterative and Predictive Ray-Traced Collision Detection for Multi-GPU Architectures," Graphics [cs.GR]. 2013.

Chaffin et al., "Simulating Reach Motions", Society of Automotive Engineers, Inc. 1999.

Li, X., et al., "Point cloud surface segmentation based on volumetric eigenfunctions of the Laplace-Beltrami operator," Computer Aided Geometric Design, 71: 157-175 (2019).

Li, Y. and N. Pollard, "A Shape Matching Algorithm for Synthesizing Humanlike Enveloping Grasps," in IEEE/RAS Int. Conf. on Humanoid Robots (Humanoids), pp. 442-449 (2005).

Li, Y., et al. "On motion planning for narrow-clearance assemblies using virtual manikins" Science Direct, 51st CIRP Conference on Manufacturing Systems, Procedia CIRP 72 (2018) 790-795.

Liu, Y. and N.I. Badler, "Real-time reach planning for animated characters using hardware acceleration.", in Proceedings 11th IEEE international workshop on program comprehension. 2003. IEEE.

Ma, C.-M., et al., "Three-dimensional topology preserving reduction on the 4-subfields," IEEE Transactions on Pattern Analysis and Machine Intelligence, 24: 1594-1605 (2002).

Macloud, A., et al., "Extracting Grasping Cues From One-Handed Tools Geometry For Digital Human Models," (2019).

Miller, A.T., et al., "Automatic grasp planning using shape primitives," in Robotics and Automation, Proceedings. ICRA'03. IEEE International Conference on, IEEE, 1824-1829 (2003).

Minetto, R., et al., "An optimal algorithm for 3D triangle mesh slicing," Computer-Aided Design, 92: 1-10 (2017).

Mital. A. et al., "Manual Materials Handling," CRC Press, Second edition, 2017, 153 pages.

Nau R., "Notes on linear regression analysis," Duke university, 2014, 18 pages.

Neumann. P., et al., "A case study evaluating the ergonomic and productivity impacts of partial automation strategies in the electronics industry," International Journal of Production Research., vol. 40, No. 16, 2002, pp. 4059-4075.

Occhipinti, E., "OCRA: a concise index for the assessment of exposure to repetitive movements of the upper limbs.", Ergonomics, vol. 41, Issue. 9, 1998, pp. 1290-1311.

Ozili. P.K., "The Acceptable R-square in Empirical Modelling for Social Science Research," A guide to non-native english speakers. IGI global, 2023, pp. 134-143.

Paudel, P., et al., "Industrial ergonomics risk analysis based on 3d-human pose estimation.", Electronics, vol. 11, Issue. 20, 2022, 20 pages.

Poirson, E., et al., "Comparative analysis of human modeling tools.", International Digital Human Modeling Symposium, Apr. 25, 2013, 8 pages.

Prisco, G., et al., "Capability of Machine Learning Algorithms to Classify Safe and Unsafe Postures during Weight Lifting Tasks Using Inertial Sensors.", Diagnostics, vol. 14, Issue. 6, 2024, pp. 1-15.

Sardar, S. K., et al., "Ergonomic risk assessment of manufacturing works in virtual reality context.", International Journal of Human-Computer Interaction, vol. 40, Issue. 14, 2024, pp. 3856-3872.

Tong, Y., et al., "Review of research and development of supernumerary robotic limbs.", IEEE/CAA Journal of Automatica Sinica, vol. 8, Issue. 5, 2021, pp. 929-952.

Turk. M. et al., "Ergonomic Evaluation of Basis Manual Assembly Operations With Integration of Simulation Tools," International Scientific Journal Industry 4.0, vol. 3, Issue 1, 2018, pp. 34-38.

Walker, G., et al., "Big data and ergonomics methods: A new paradigm for tackling strategic transport safety risks.", Heriot-Watt University, vol. 53, Issue. Part B, 2016, pp. 298-311.

Wang, J., et al., "3D fuzzy ergonomic analysis for rapid workplace design and modification in construction.", Automation in Construction, vol. 123, 2021, 14 pages.

Xie. Y et al., "Fitts' law on the flight deck: evaluating touchscreens for aircraft tasks in actual flight scenarios," ERGONOMICS, vol. 66, No. 4, 2023, pp. 506-523.

Yin, M.Y., et al., "A systematic review on digital human models in assembly process planning.", The International Journal of Advanced Manufacturing Technology, vol. 125, Issue. 3, 2023, pp. 1037-1059.

Bohlin et al. ("Automatic Creation of Virtual Manikin Motions

(56) References Cited

OTHER PUBLICATIONS

Maximizing Comfort in Manual Assembly Processes", Elsevier pub., 2012, pp. 1-5) (Year: 2021).

\* cited by examiner

FIG. 3

| | A | B | D | E | G | H | I | J | K |
|---|---|---|---|---|---|---|---|---|---|
| 1 | Vision priority in function of the combination of Phrases actions | | Align | Assemble | BendFold | Clean | Clip | Connect | Crimp | Cut |
| 2 | Align | Align | Align | Align | Align | Align | Align | Align | Align |
| 4 | Assemble | Align | Assemble | Assemble | Assemble | Clip | Connect | Assemble | Assemble |
| 5 | BendFold | Align | Assemble | BendFold | BendFold | Clip | Connect | Crimp | Cut |
| 7 | Clean | Align | Assemble | BendFold | Clean | Clip | Connect | Crimp | Cut |
| 8 | Clip | Align | Clip | Clip | Clip | Clip | Connect | Crimp | Cut |
| 9 | Connect | Align | Connect | Connect | Connect | Connect | Connect | Connect | Connect |
| 10 | Crimp | Align | Assemble | Crimp | Crimp | Crimp | Connect | Crimp | Cut |
| 11 | Cut | Cut | Assemble | Cut | Cut | Cut | Connect | Cut | Cut |
| 13 | Drill | Drill | Assemble | Drill | Drill | Drill | Drill | Drill | Drill |
| 14 | Get | Align | Assemble | BendFold | Clean | Clip | Connect | Crimp | Cut |
| 15 | Grind | Grind | Assemble | Grind | Grind | Grind | Connect | Grind | Grind |
| 16 | Hammer | Hammer | Hammer | Hammer | Hammer | Hammer | Hammer | Hammer | Hammer |

FIG. 6

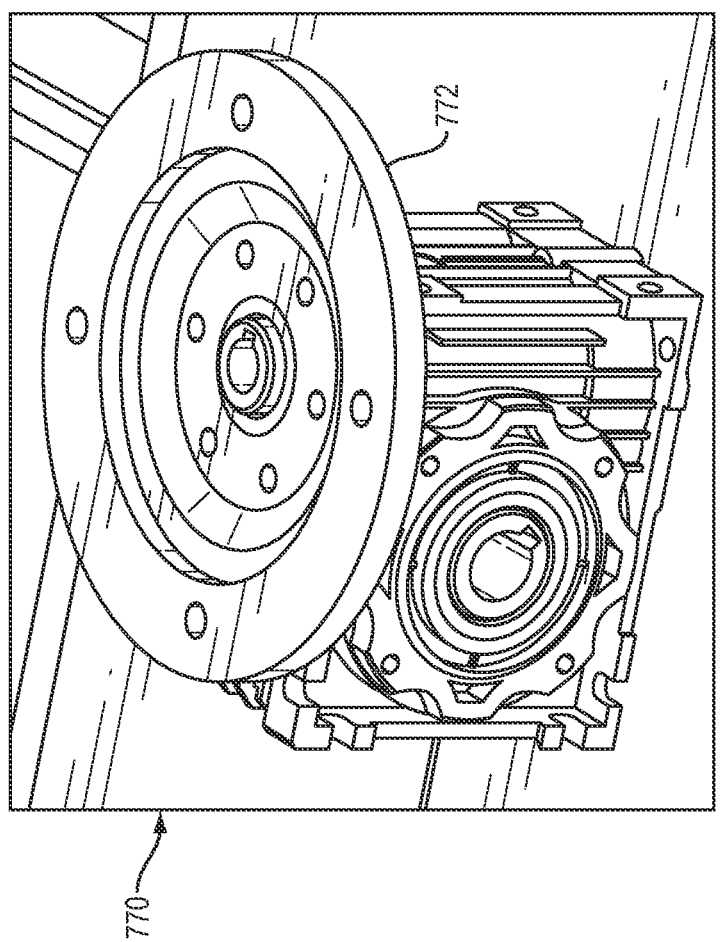

FIG. 7F

| | A | B | C | D | E | F | F | G | H | I |
|---|---|---|---|---|---|---|---|---|---|---|
| 1 | Action (Current) | What (Current) | Preposition (Current) | With/Where (Current) | SPE Grasp (Target object) | SPE (grasp type) | SPE Vision (Target object) | SPE Vision (Repere specifique) | SPE Vision (Type) |
| 2 | Align | Provided | --- | --- | Provided | NA | Provided | GeometricalCenter | WithPrecision |
| 3 | Align | Provided | with | Ergo_Plier | Ergo_Plier | NA | Provided | GeometricalCenter | WithPrecision |
| 4 | Align | Provided | with | Ergo_Tweezers | Ergo_Tweezers | NA | Provided | GeometricalCenter | WithPrecision |
| 5 | Apply | Virtual_Glue | with | Ergo_Brush | Ergo_Brush | NA | Ergo_Brush | ToolTip | WithinFieldOfView |
| 6 | Apply | Virtual_Glue | with | Ergo_GlueDispen | Ergo_GlueDispenser | NA | Ergo_GlueDispenser | ToolTip | WithinFieldOfView |
| 7 | Apply | Virtual_Glue | with | Ergo_Roller | Ergo_Roller | NA | Ergo_Roller | ToolTip | WithinFieldOfView |
| 8 | Apply | Virtual_Lubricant | with | Ergo_LubricantDis | Ergo_LubricantDispenserGun | NA | Ergo_LubricantDispenserGun | ToolTip | WithinFieldOfView |
| 9 | Apply | Virtual_Paint | with | Ergo_Brush | Ergo_Brush | NA | Ergo_Brush | ToolTip | WithinFieldOfView |
| 10 | Apply | Virtual_Paint | with | Ergo_PaintGunSp | Ergo_PaintGunSprayGun | NA | Ergo_PaintGunSprayGun | ToolTip | WithinFieldOfView |
| 11 | Apply | Virtual_Paint | with | Ergo_Roller | Ergo_Roller | NA | Ergo_Roller | ToolTip | WithinFieldOfView |
| 12 | Apply | Virtual_Sealant | with | Ergo_SealantDisp | Ergo_SealantDispenserGun | NA | Ergo_SealantDispenserGun | ToolTip | WithinFieldOfView |

| J Action (add Before) | K What (add Before) | L Preposition (add Before) | M With/Where (add Before) | N Action (add After) | O What (add After) | P Preposition (add After) | Q With/Where (add After) |
|---|---|---|---|---|---|---|---|
| Get | Provided | --- | Select | Insert | Provided | --- | --- |
| Get | Provided | with | Ergo_Plier | Insert | Provided | with | Ergo_Plier |
| Get | Provided | with | Ergo_Tweezers | Insert | Provided | with | Ergo_Tweezers |
| Get | Ergo_Brush | --- | Select | Place | Ergo_Brush | --- | Select |
| Get | Ergo_GlueDispenser | --- | Select | Place | Ergo_GlueDispenser | --- | Select |
| Get | Ergo_Roller | --- | Select | Place | Ergo_Roller | --- | Select |
| Get | Ergo_LubricantDispenserG | --- | Select | Place | Select | --- | Select |
| Get | Ergo_Brush | --- | Select | Place | Ergo_Brush | --- | Select |
| Get | Ergo_PaintGunSprayGu | --- | Select | Place | Ergo_PaintGunSprayGu | --- | Select |
| Get | Ergo_Roller | --- | Select | Place | Ergo_Roller | --- | Select |
| Get | Ergo_SealantDispenserGu | --- | Select | Place | Ergo_SealantDispenserGu | --- | Select |

FIG. 7G (Continued)

| R | S "What" contextual move option when selected | T "Where" contextual move option when selected | U Default positioning |
|---|---|---|---|
| | - Option de Snap @ Design position | - UI cible main(s) | - If unique (or first???) WT of this Operation, apply "Operation Position and all "Resources Position" that exist in this Operation. ...ces positions devrait être "Prioritaire" à un pre-positionnement manuel effectuer suite à un Sync. - At Provided selection in What menu, the provided is position at assembled (assembly must exist to use Align -- > Dynamic filter??) - The Assembly is not movable (in transparency), the user must create a WT before to reposition it (sinon: l'U pourrait bousiller le offset de l'assy sur une resource. Ex.: IP sur Carrier). Si c'est sur du line tErgo_Racking. |
| | - Option de Snap @ Design position (if there is an assembly) | - Option de Apply resource position (if defined) | - If this WT is unique and a "Resource position" for this resource has been defined in this Op -> apply Resource position to the Resource - At Provided selection in What menu, the provided is position at assembled (if assembly exist) - The Assembly is not movable (in transparency), the user must create a WT before to reposition it. |
| | - Option de Snap @ Design position (if there is an assembly) | - Option de Apply resource position (if defined) | - If this WT is unique and a "Resource position" for this resource has been defined in this Op -> apply Resource position to the Resource - At Provided selection in What menu, the provided is position at assembled (if assembly exist) - The Assembly is not movable (in transparency), the user must create a WT before to reposition it. |
| | --- | - Option de Apply resource position (if defined) | - If this WT is unique and a "Resource position" for this resource has been defined in this Op -> apply Resource position to the Resource |
| | --- | - Option de Apply resource position (if defined) | - If this WT is unique and a "Resource position" for this resource has been defined in this Op -> apply Resource position to the Resource |
| | --- | - Option de Apply resource position (if defined) | - If this WT is unique and a "Resource position" for this resource has been defined in this Op -> apply Resource position to the Resource |
| | --- | - Option de Apply resource position (if defined) | - If this WT is unique and a "Resource position" for this resource has been defined in this Op -> apply Resource position to the Resource |
| | --- | - Option de Apply resource position (if defined) | - If this WT is unique and a "Resource position" for this resource has been defined in this Op -> apply Resource position to the Resource |
| | --- | - Option de Apply resource position (if defined) | - If this WT is unique and a "Resource position" for this resource has been defined in this Op -> apply Resource position to the Resource |
| | --- | - Option de Apply resource position (if defined) | - If this WT is unique and a "Resource position" for this resource has been defined in this Op -> apply Resource position to the Resource |

FIG. 7G (Continued)

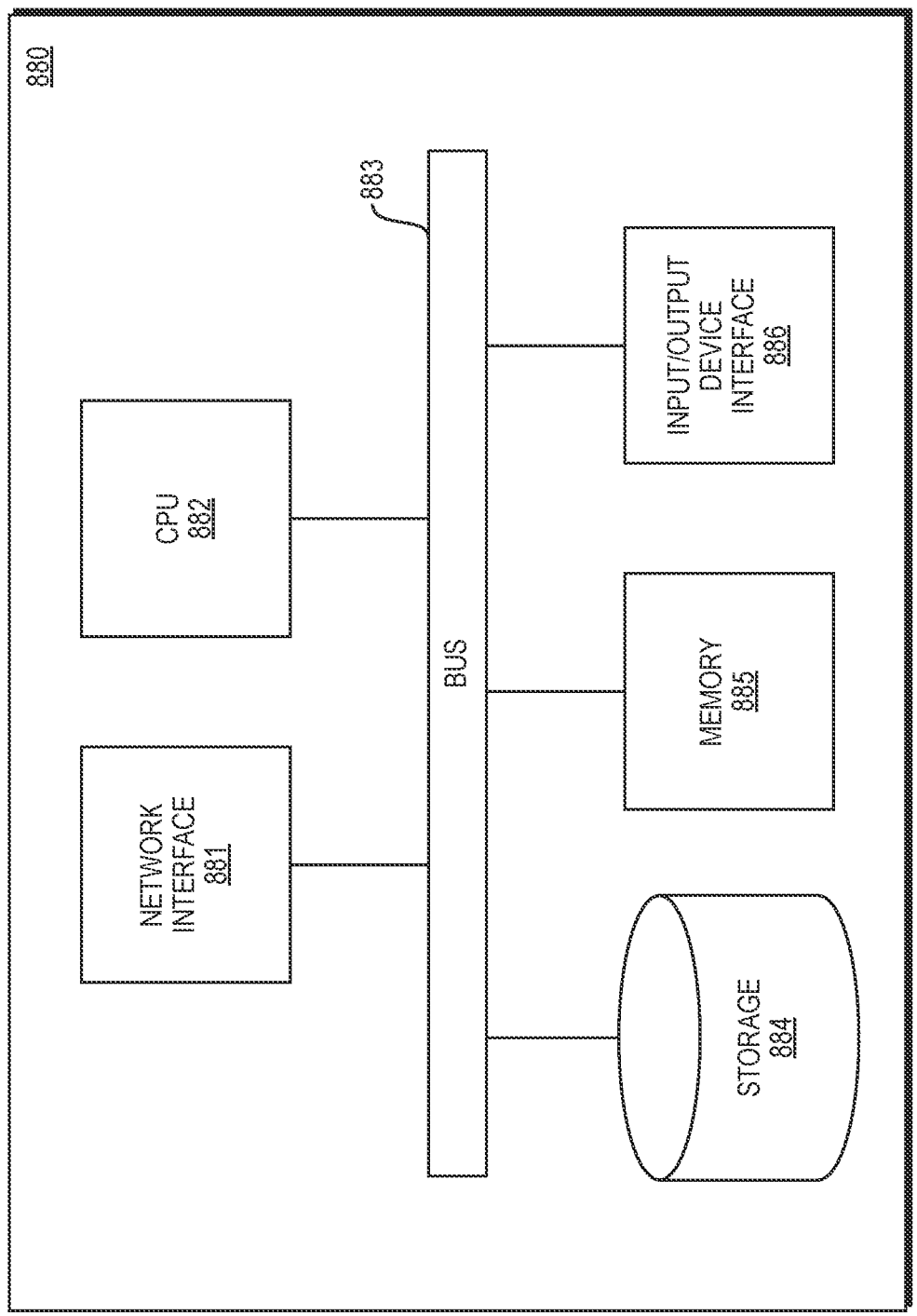

SMART PHRASE GENERATOR TO INSTRUCT DIGITAL MANIKIN ACTION

BACKGROUND

A number of existing product and simulation systems are offered on the market for the design and simulation of objects, e.g., humans, parts, and assemblies of parts, amongst other examples. Such systems typically employ computer aided design (CAD) and/or computer aided engineering (CAE) programs. These systems allow a user to construct, manipulate, and simulate complex three-dimensional (3D) models of objects or assemblies of objects. These CAD and CAE systems, thus, provide a representation of modeled objects using edges, lines, faces, polygons, or closed volumes. Lines, edges, faces, polygons, and closed volumes may be represented in various manners, e.g., non-uniform rational basis-splines (NURBS).

CAD systems manage parts or assemblies of parts of modeled objects, which are mainly specifications of geometry. In particular, CAD files contain specifications, from which geometry is generated. From geometry, a representation is generated. Specifications, geometries, and representations may be stored in a single CAD file or multiple CAD files. CAD systems include graphic tools for representing the modeled objects to designers; these tools are dedicated to the display of complex objects. For example, an assembly may contain thousands of parts. A CAD system can be used to manage models of objects, which are stored in electronic files.

CAD and CAE systems use of a variety of CAD and CAE models to represent objects. These models may be programmed in such a way that the model has the properties (e.g., physical, material, or other physics based) of the underlying real-world object or objects that the model represents. Moreover, CAD/CAE models may be used to perform simulations of the real-word objects/environments that the models represent.

SUMMARY

Analyzing ergonomics and simulating an agent in an environment are common simulation tasks implemented and performed by CAD and CAE systems. Here, an agent refers to an entity which can observe and act upon an environment e.g., a human, an animal, or a robot, amongst other examples. Such functionality can be used to automatically predict behavior of the agent in the environment when performing a task with one or more target objects. Amongst other examples, these simulations can determine position and orientation of a human when assembling a car in a factory. The results of the simulations can, in turn, be used to improve the physical environment. For example, simulation results may indicate that ergonomics or manufacturing efficiency can be improved by relocating objects in the environment.

Performing simulations requires a posture, i.e., position and orientation, of the agent, i.e., digital human model, manikin, etc., in a virtual representation of the environment of interest. In common digital human modelling, posturing a manikin requires manipulation of joint degrees of freedom or kinematic chain end-effector manipulation. In the last decade, manikin posturing has evolved and can be implemented using manually defined targets for each kinematic chain end effector, e.g., hands and vision, however time is still considered to be a big obstacle to the use of Digital Human Models [8]. Further, manikin posturing in virtual environments can be implemented using direct and indirect kinematics and/or manually defined targets. Even with the latest capabilities, from Jack [1] and IPS IMMA [2] to name just a few, manual intervention that consumes manufacturing engineers' precious time is still required to determine manikin posture [3].

Embodiments solve these problems and provide functionality that does not require laborious manual intervention to determine a posture for a manikin in a simulation of a real-world environment. An example computer-implemented embodiment begins by receiving environment data. Next, such an embodiment automatically generates a phrase by performing a hierarchical analysis using the received environment data. In an embodiment, the generated phrase describes a task performed by a manikin in an environment that is going to be simulated. To continue, one or more posture engine inputs are determined based on the generated phrase. In turn, a posture for the manikin in a simulation of the manikin performing the task in the represented environment is automatically determined based on the determined one or more posture engine inputs. That is, a digital processor automatically (without human intervention) computes or otherwise configures posture for the manikin as a function of the determined one or more posture engine inputs.

According to an example embodiment, the environment data includes at least one of: one or more operations; a sequence of tasks comprising an operation; one or more parts assigned to an operation; one or more resources assigned to an operation; a sequence of operations; one or more objects in the environment; position of the one or more objects in the environment; context of the task; and task validation premises.

In an embodiment, the generated phrase is comprised of: (i) a verb component indicating an action of the task (e.g., an operation), (ii) a what component (e.g., subject component, noun component, operator, operand, etc.) indicating what the verb component pertains to, (iii) a preposition component, and (iv) a with or where component indicating an object used for the action or where the action is performed.

An example embodiment performs the hierarchical analysis using the received environment data by first determining candidate phrases based on the environment data and, second, hierarchically filtering the candidate phrases based on the environment data to generate the phrase. According to an embodiment, hierarchically filtering the candidate phrases comprises eliminating invalid phrases from the determined candidate phrases and eliminating phrases with an invalid interaction object.

Another embodiment, prior to determining the one or more posture engine inputs, receives an indication of user approval of the phrase. Further, according to another embodiment, the one or more posture engine inputs include at least one of: grasp target, vision target, vision acuity for the manikin performing the task, and an indication if object weight is considered. Another embodiment determines the one or more posture engine inputs based on the generated phrase by searching a mapping using components of the generated phrase, wherein results of the searching indicate the one or more posture engine inputs. In an example embodiment, the mapping indicates respective posture engine inputs corresponding to respective phrase components.

According to an embodiment, automatically determining the posture comprises: (i) providing the determined posture engine inputs to a posturing engine configured to determine (generate) the posture based upon the provided posture engine inputs, and (ii) receiving the generated posture from the posture engine.

An embodiment simulates the manikin performing the task in the represented environment using the determined posture. Such an embodiment may determine a change to a virtual workstation for the manikin performing the task based on results of the simulation which in turn provides an indication of change to the corresponding real-world workstation for performance of the subject task.

Another embodiment of the present invention is directed to a system that includes a processor and a memory with computer code instructions stored thereon. In such an embodiment, the processor and the memory, with the computer code instructions, are configured to cause the system to implement any embodiments or combination of embodiments described herein.

An embodiment is directed to a cloud computing implementation for determining manikin posture. Such an embodiment is directed to a computer program product executed by a server in communication across a network with one or more clients. The computer program product comprises program instructions which, when executed by a processor, causes the processor to implement any embodiments or combination of embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 3 is a user interface showing a phrase generated by an embodiment.

FIG. 6 is a table depicting a prioritization logic that may be employed in embodiments.

FIGS. 7A-G illustrate steps of using an embodiment to posture a manikin in a digital environment of interest.

FIG. 8 is a simplified diagram of a computer system for determining manikin posture according to an embodiment.

DETAILED DESCRIPTION

A description of example embodiments follows.

Analyzing ergonomics and simulating an agent in an environment are common simulation tasks implemented and performed by CAD and CAE systems. Performing these simulations requires a posture, i.e., position and orientation, of the agent, i.e., digital human model, manikin, etc., in the environment.

Functionality exists, such as the Smart Posturing Engine (SPE) developed by the Applicant, to automatically posture a manikin based upon inputs. However, there is no such functionality to automatically determine the inputs required by posture engines, e.g., SPE. As such, to provide a user-friendly posture solution functionality is needed to determine inputs for posture engines. A good interface to determine inputs for these existing posturing engines should be comprehensible to the user and gather enough information for determining the posture engine inputs. Embodiments fulfill these requirements and much more. Embodiments generate a phrase which presents in words the desired manikin task in a visual interface. In turn, this generated phrase can be used to determine posture engine input and ultimately a posture for a manikin.

Embodiments provide an automated new way of instructing a manikin task so as to compute a probable and repeatable posture. Embodiments utilize multiple inputs, such as the operations assignations and the surrounding resources in the environment, and then, generate a logic "phrase" describing, in the user language (i.e., natural language), the task to be simulated. This phrase can then be provided to a posturing engine to determine a posture for the manikin. Such functionality prevents a user from having to manually posture a manikin. If desired, the user can validate the phrase with a single click to generate a posture. This saves user time and induces uniformity in the results between users, e.g., engineers.

Figure 1:
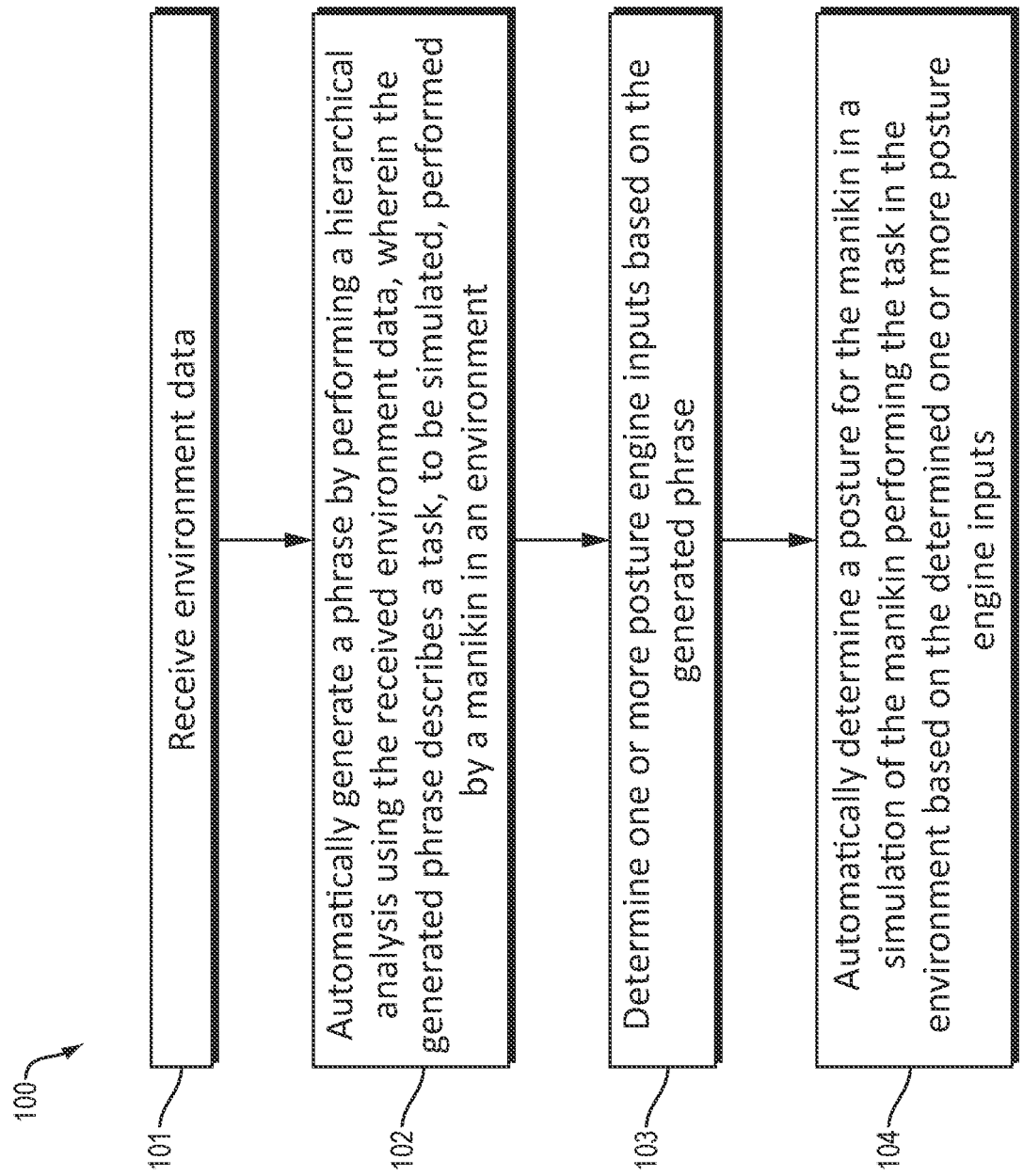
FIG. 1 is a flowchart of a method for determining a posture for a manikin according to an embodiment.

FIG. 1 is a flowchart of a method 100 for determining a posture for a manikin according to an embodiment. The method 100 begins at step 101 by receiving environment data. The method 100 is used to determine a posture for a manikin when performing a task in an environment that is being simulated. Thus, the environment data received at step 101 may be any data regarding the environment and task being simulated. For instance, according to an example embodiment, the environment data includes at least one of: one or more operations; a sequence of tasks comprising an operation; one or more parts assigned to an operation; one or more resources assigned to an operation; a sequence of operations; one or more objects in the environment; position of the one or more objects in the environment; context of the task; and task validation premises, amongst other examples. It is noted that the foregoing listing is but an example of environment data and embodiments are not limited to utilizing the listed data. Further, there may be variations amongst the listed data. For instance, an operation may not have any assigned part and may not have any assigned resource.

The method 100 is computer implemented and, as such, the environment data may be received at step 101 from any memory or data storage that can be communicatively coupled to a computing device implementing the method 100.

To continue, at step 102, the method 100 automatically generates a phrase by performing a hierarchical analysis using the received environment data. The generated 102 phrase describes a task, to be simulated, performed by a manikin in an environment. According to an embodiment, the phrase generated at step 102 is a natural language phrase describing the task to be performed by the manikin in the environment. For instance, in an example embodiment, the generated phrase is comprised of: (i) a verb component indicating an action of the task, (ii) a what component indicating what the verb component pertains to, (iii) a preposition component, and (iv) a with or where component indicating an object used for the action or where the action is performed.

In an embodiment of the method 100, the hierarchical analysis performed at step 102 includes the filtering method 550 described herein below in relation to FIG. 5. According to another embodiment, at step 102, performing the hierarchical analysis using the received 101 environment data includes, first, determining candidate phrases based on the environment data. An embodiment of the method 100 utilizes a database storing possible phrases. In such an embodiment, the phrases in this database are the candidate phrases. Second, the determined candidate phrases are hierarchically filtered based on the environment data to generate the phrase. Amongst other examples, hierarchically filtering the candidate phrases includes eliminating invalid phrases from the determined candidate phrases and eliminating phrases with an invalid interaction object.

To illustrate, consider an example where, at step 101, environment data is received that indicates that the task being simulated is tightening a bolt with a wrench. At step 102, the identified candidate phrases are the phrases in a database (a database of all possible phrases). In such an illustrative embodiment, first, invalid phrases are eliminated from the identified candidate phrases. In this example, all phrases from amongst the candidate phrases that do not involve tightening a bolt are eliminated at the first stage of the hierarchical analysis. Second, from amongst the remaining candidate phrases, all phrases, with an invalid interaction object are eliminated from the remaining candidate phrases. At this second stage, in this illustrative example, all phrases that do not involve tightening with a wrench are eliminated, e.g., phrases that include an impact driver are eliminated.

Returning to FIG. 1, at step 103, one or more posture engine inputs are determined based on the generated phrase output of step 102. According to embodiments, the one or more posture engine inputs determined at step 103 include at least one of: grasp target, vision target, vision acuity for the manikin performing the task, and an indication if object weight is considered.

An embodiment determines the one or more posture engine inputs at step 103 based on the generated phrase by searching a mapping using components of the generated phrase. In such an embodiment, results of the searching indicate the one or more posture engine inputs. The mapping utilized in such an embodiment indicates respective posture engine inputs corresponding to respective phrase components.

To illustrate step 103, consider an example embodiment where the generated phrase (output from step 102) is "tightening a bolt with a wrench." The mapping to this phrase would return, as the posture engine inputs: the first item (tightening) as a precision view required, the second item (the bolt) as the vision target, and the third item (the wrench) as the grasping target.

An embodiment of the method 100 requires user approval of the phrase generated at step 102 prior to determining the one or more posture engine inputs at step 103. To facilitate this approval, such an embodiment provides the phrase generated at step 102 to a user. For example, the phrase generated at step 102 may be presented to a user in a graphical user interface. The user then provides some indication of phrase approval and this indication of approval is received at the computing device implementing the method 100 and, in response, the method 100 moves to step 103.

At step 104, a posture for the manikin in a simulation of the manikin performing the task in the environment is automatically determined based on the determined one or more posture engine inputs. According to an embodiment, the posture determined at step 104 is a position and orientation for the manikin in the environment. For example, the posture may be an initial position and orientation for the manikin when performing the task being simulated. In an embodiment, the posture for the manikin is determined at step 104 by (1) providing the determined posture engine inputs to a posturing engine configured to determine (or otherwise generate) the posture based upon the provided posture engine inputs and (2) receiving the generated posture from the posture engine.

An embodiment of the method 100 goes further and simulates the manikin performing the task in the environment using the posture determined at step 104. The results of performing the simulation may be used to modify the real-world environment that was simulated. For example, the simulation results may indicate that a change to a workstation position the human is using would improve ergonomics and efficiency.

What follows is a further description and examples of embodiments and the functionality thereof in the process engineering domain in a manufacturing context. However, it is noted that embodiments are not limited to the process engineering domain and manufacturing context, and embodiments may be utilized for any application in any domain, industry, or context where manikin posture determination is desired.

In a manufacturing simulation context, as an overview, an example embodiment, first predicts the most probable working tasks to be executed by the manikin. One such embodiment dynamically generates this prediction based on (i) a process plan, (ii) surrounding resources in the environment, and (iii) already existing working tasks. Second, such an embodiment presents the predicted most probable working task(s) to the user in a common language sentence. Third, the user validates the phrase and, in response, the posture for the manikin is automatically generated by the embodiment method and system.

Process engineering defines and deals with notions like manufacturing bill of materials (MBOM), resources, systems, and operations. Thus, the following information explains how embodiments use the process engineering information (e.g., environment data) to predict the most probable phrase for purposes of generating a manikin posture.

Generally, engineering process systems contain some listing of the operations to be executed by the worker, i.e., manikin, in the simulation. However, an operation can represent either a general statement or a very detailed small step. To allow the detailing of any operation, especially the general ones, a system executing embodiments allows operations to be further refined. The refined operations are made of worker tasks (WT) and they may be structured in the listing of operations as the children of operations. In an embodiment, each operation may be divided in several WTs, where each WT represents one of the postures a worker would take. In other words, each WT represents a point in the simulation for which a posture determination is desired and embodiments may be utilized to determine such postures.

Figure 2:
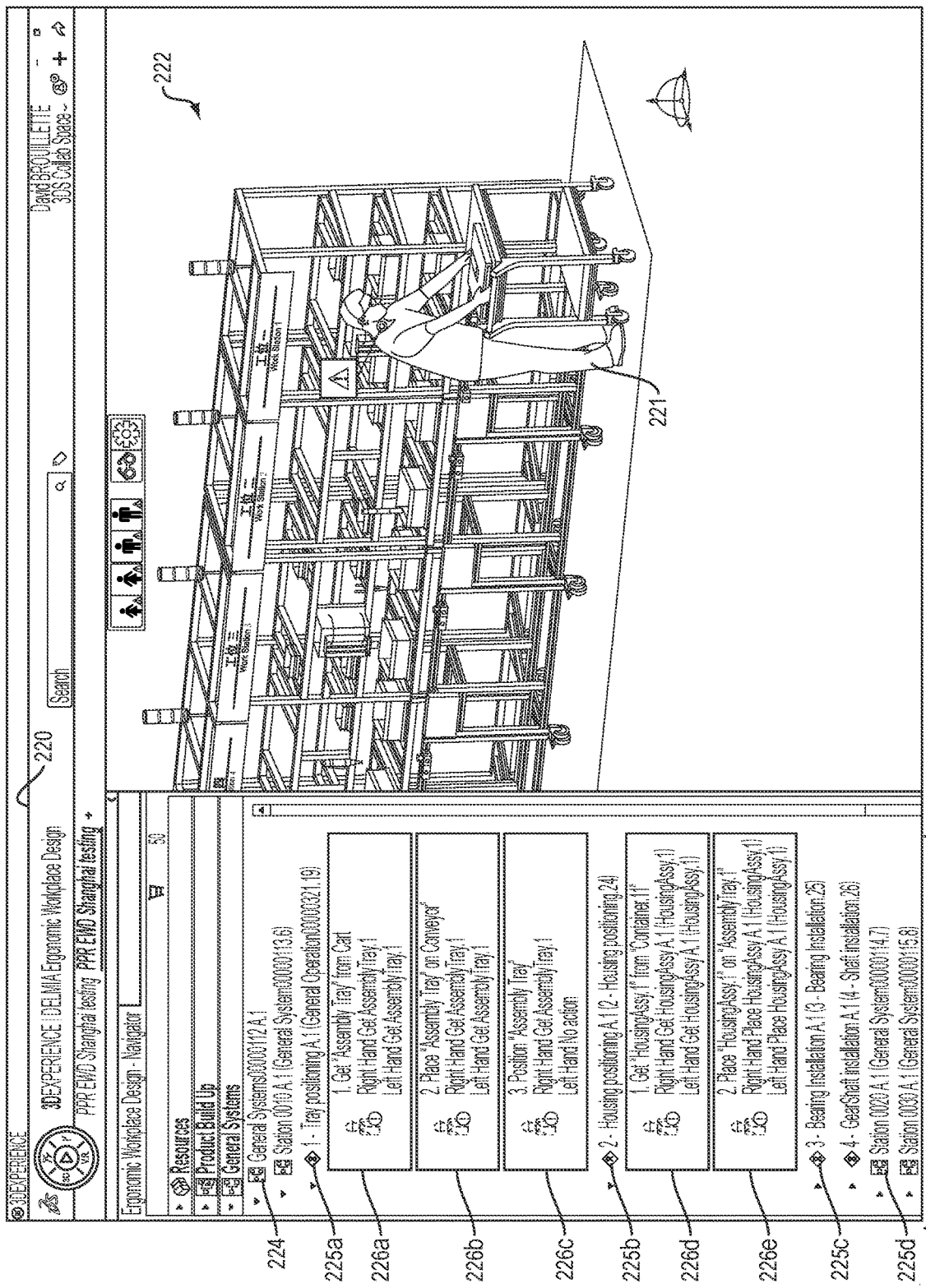
FIG. 2 illustrates a digital environment in which an embodiment may be implemented.

FIG. 2 illustrates a simulation program interface 220 where embodiments may be used to determine postures for the manikin 221 in the environment 222. The interface 220 includes the navigator 223 that shows an organization of systems 224, operations 225*a-d*, and WTs 226*a-e*.

In the interface 220 each WT 226*a-e* utilizes a posture and presents a point in the simulation of the manikin 221 operating in the environment 222 where a phrase may be generated using embodiments to determine a posture. In an implementation, a phrase is automatically generated by an embodiment for each WT 226*a-e* and, consequently, a posture is generated by a posturing engine, e.g., SPE, using the generated phrases. In embodiments, the generated phrases are not default phrases and, instead, the generated phrases are particular to the simulation and the tasks 226a-e being simulated.

Input Information

Embodiments use various information, e.g., environment data, to generate phrases. Example information includes information about objects in the environment (e.g., CAD modeled objects), manufacturing premises, and information that is available from the simulation system, e.g., an engineering process planning system.

One example of data used in embodiments is data stored in the simulation system, e.g., process planning system, in which the posture is going to be used. In the simulation planning phase, a process engineer normally defines the operations to be simulated. Defining the operations may include assigning, to the operations, part(s) that will be added to the assembly (from a manufacturing bill of materials) and assigning what resource(s) will be used (e.g., tooling). This allows embodiments to provide a visualization of the product buildup (e.g., an indication of the assembly state of a product at a specific time on a production line) when navigating through the operations. In addition, a process engineer can also define a position to those assigned items (parts and resources) to visualize where the assembly task occurs, e.g., on an assembly line. This information is very useful to embodiments, but insufficient to determine the task the worker has to do for each operation. For instance, the location of manikin hands and vision targets are unknown even when the location of objects is known.

Other information that can be utilized by embodiments is sequence information. For instance, if embodiments are being utilized as part of a simulation that includes several different operations, the order of these operations can be used by embodiments to determine the phrase. In one such embodiment, an operations system (e.g., DELMIA Process Planning provided by the Applicant) contains information on the sequence. An embodiment can access flow links defined in a process planning application and, by accessing the flow links, an embodiment discerns which operation happens before or after each operation.

An embodiment processes known environment data (e.g., assigned items to the operations) to identify surrounding object(s) which may be of interest. One such embodiment utilizes a volumetric filter with the known objects (product part or resources) location information to identify the location of additional objects. To illustrate, in an embodiment where the task being simulated is on an assembly line, an embodiment can identify objects in the environment using a volumetric filter. Such functionality can be utilized to identify resources that may be required by the operation (thus part of the "Phrase"), but where the resources have not been assigned.

Yet another example of environment data that may be utilized in embodiments is operation context data. The context when a worker task is created results in data that may be used by embodiments. For example, if the user moved an object, this context indicates it is highly probable that this moved object should be included in the predicted phrase.

Another embodiment also considers validation information. For example, in order to choose the most probable phrase, an embodiment heavily weights manufacturing task validation. In such an example, the input data identifies whether, for instance, necessary parts are available. This allows phrase generation to prioritize an assembly task over part supply from storage. This is because if the assembly task is not possible, then it may be useless, at this point in time, to validate the supply logistic tasks.

Phrase Generation

Figure 3:
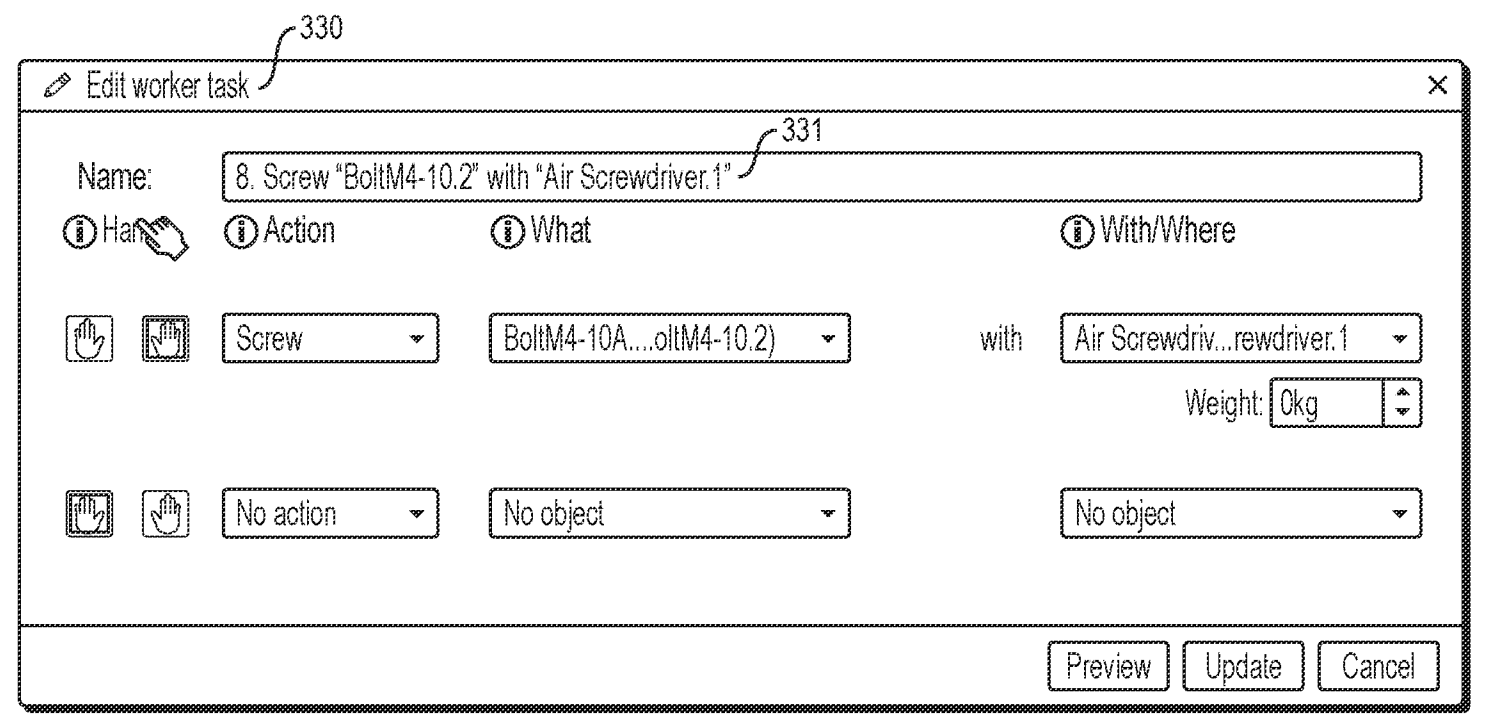

While a user can manually set worker task phrases, avoiding manually setting phrases through use of embodiments saves a considerable amount of user time. Advantageously, embodiments perform automatic reasoning on the input data, e.g., environment data, to automatically set the phrase according to the simulation being performed, e.g., manufacturing process context. According to an embodiment, the phrase is composed of four items (i) an "action" verb, (ii) a "what", (iii) a "preposition," and (iv) a "with or where." FIG. 3 shows an example phrase 331 in the interface 330 that would lead to a worker screwing a bolt holding a screwdriver in his right hand. In embodiments, the predicted phrase can evolve as data is being obtained, e.g., as WTs are created. From the user perspective, the result of embodiments is not only to define the desired phrase, but also to enable worker task creation in one click.

Figure 4:
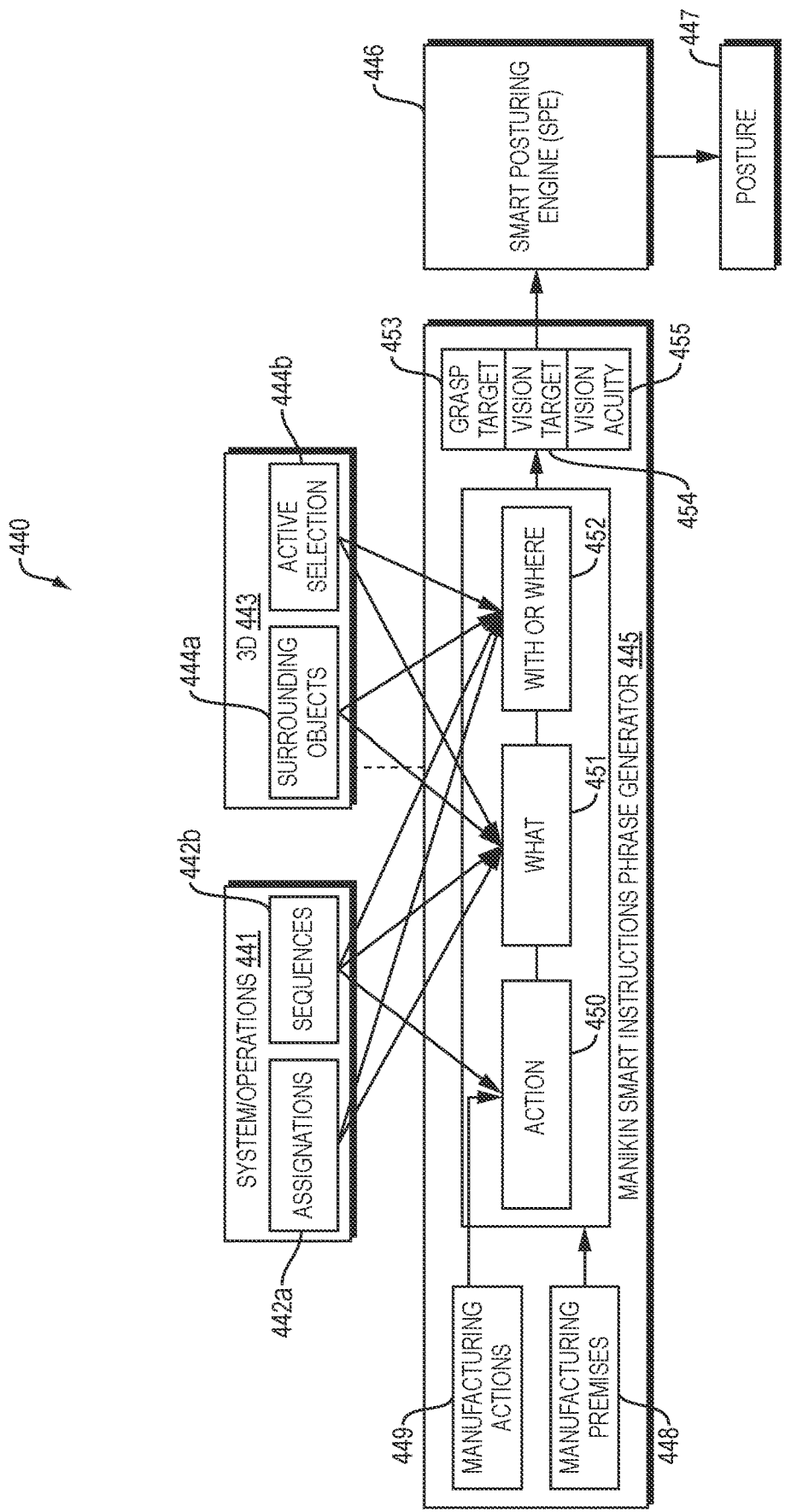
FIG. 4 is a simplified block diagram of a system embodiment for generating a phrase for posture determination.

FIG. 4 illustrates a system 440 that is configured to generate a posture according to an embodiment. The system 440 begins with the contextual inputs that include the systems/operations inputs 441 and the 3D inputs 443. The systems/operations inputs 441 include the assignations 442a and sequences 442b. The assignations 442a are the declaration, usually done by someone with the role of the process planner, of what part(s) (e.g. a bolt) and/or resource(s) (e.g. a wrench) are provided to a specific operation. That person also defines the sequences 442b by declaring which operations happen before or after other operations (e.g., insert washer operation occurs before a nut tightening operation). The 3D inputs 443 include the surrounding object data 444a (i.e., indications of known objects (e.g., objects and types) within a specific range around the assigned 442a objects) and active selection indication 444b (i.e. the last 3D object the user has voluntarily selected in the interface, e.g., 220). The system 440 also includes the phrase generator 445 and the smart posturing engine 446 that outputs a posture 447. In the system 440 the phrase generator 445 generates a phrase and derives the inputs needed by the posturing engine 446 from the generated phrase.

In operation, the phrase generator 445 operates in conjunction with a database of "phrase parts." Such a database is structured to include a listing of possible phrase components. For instance, if phrases include an (i) "action" verb component, (ii) a "what" component, (iii) a "preposition" component, and (iv) a "with or where" component, such a database would include a list of all possible verb, what, preposition, and with or where components that may be used to construct phrases.

The phrase generator 445 first filters the database using the input data 442a-b and 444a-b to determine any possible combinations of logical and valid phrases composed of an action 450, what 451, and with or where 452. In other words, this first step identifies possible action 450, what 451, and with or where 452 components in the database that are in accordance with the data 442a-b and 444a-b. At this point, there are multiple phrases possible. For example, if a part, a screwdriver, and a jig has been assigned to an operation, the phrases "Screw part with the screwdriver" and "Place the part on a jig" are both probable and valid. In turn, the phrase generator 445 applies a series of decision steps and filters to narrow down the possibilities and end with a final phrase. This series of decision steps and filters may be carried out using the method 550 described herein below in relation to FIG. 5. In operation, after the possible combinations of valid phrases are identified, the manufacturing actions 449 and manufacturing premises 448 are considered to further refine the listing of possible action 450, what 451, and with or where 452 components to the most probable action 450, what 451, and with or where 452 components. Examples of manufacturing premises 448 include (i) prioritizing a candidate item in a phrase listing if it is a usable resource (i.e., the manikin can interact with it) that has been assigned to the operation (this is because a user explicitly declared its use) and (ii) not all resources have equal value for purposes of interaction (e.g., a hand tool should be prioritized over storage, which should be prioritized over furniture). According to an embodiment, manufacturing actions 449 are actions that add to a product. Example manufacturing actions 449 include assembling, clipping, connecting, riveting, screwing, and tightening, amongst other examples. In an embodiment, manufacturing actions 449 do not include actions such as getting, touching, checking, and unloading, amongst other examples.

In an embodiment, the action component 450 is identified using the manufacturing action indication 449 and sequence indication 442*b*. The what component 451 is identified using the assignation 442*a*, sequence 442*b*, surrounding object 444*a*, and active selection 444*b*. Likewise, the phrase generator 445 determines the with or where 452 using the assignation 442*a*, sequence 442*b*, surrounding object 444*a*, and active selection 444*b*. The action component 450, what component 451, and with or where component 452 make up the phrase.

To continue, the phrase generator 445 determines the posture engine inputs, which include the grasp target 453, vision target 454, and vision acuity 455. In an embodiment, the phrase generator 445 uses a mapping that indicates what the grasp target 453, vision target 454, and vision acuity target 455 should be based on the determined action component 450, what component 451, and with or where component 452. In other words, this mapping translates the determined phrase components, action 450, what 451, and with or where 452, to the grasp target 453, vision target 454, and vision acuity 455. For example, with the phrase "Align part with pliers", the mapping indicates the pliers is the grasp target and the mapping indicates that since the object to be aligned is not the pliers, the part is the vision target. Also since the action requires landmark or details, the mapping indicates the vision acuity is "precision" rather than only "within field of view."

To continue, the grasp target 453, vision target 454, and vision acuity 455 are provided to the posturing engine 446 that is configured to determine the posture 447 (i.e., a position, location, and orientation of the manikin while reaching the target, along with the hand and vision of manikin, without collision) based on the provided grasp target 453, vision target 454, and vision acuity 455. With these inputs 453, 454, and 455, the posturing engine prepositions the digital human in front and towards the object(s) to grab, estimates the grasp mode and grasp location, and finally estimates the whole manikin posture. In an embodiment, the posturing process performed by the engine 446 relies on an optimization solver based on the pseudo-inverse of the Jacobian matrix that involves postural stability, joint mobility (including line of sight) and ergonomic guidelines (e.g. ISO11226, EN1005-3).

Figure 7A:
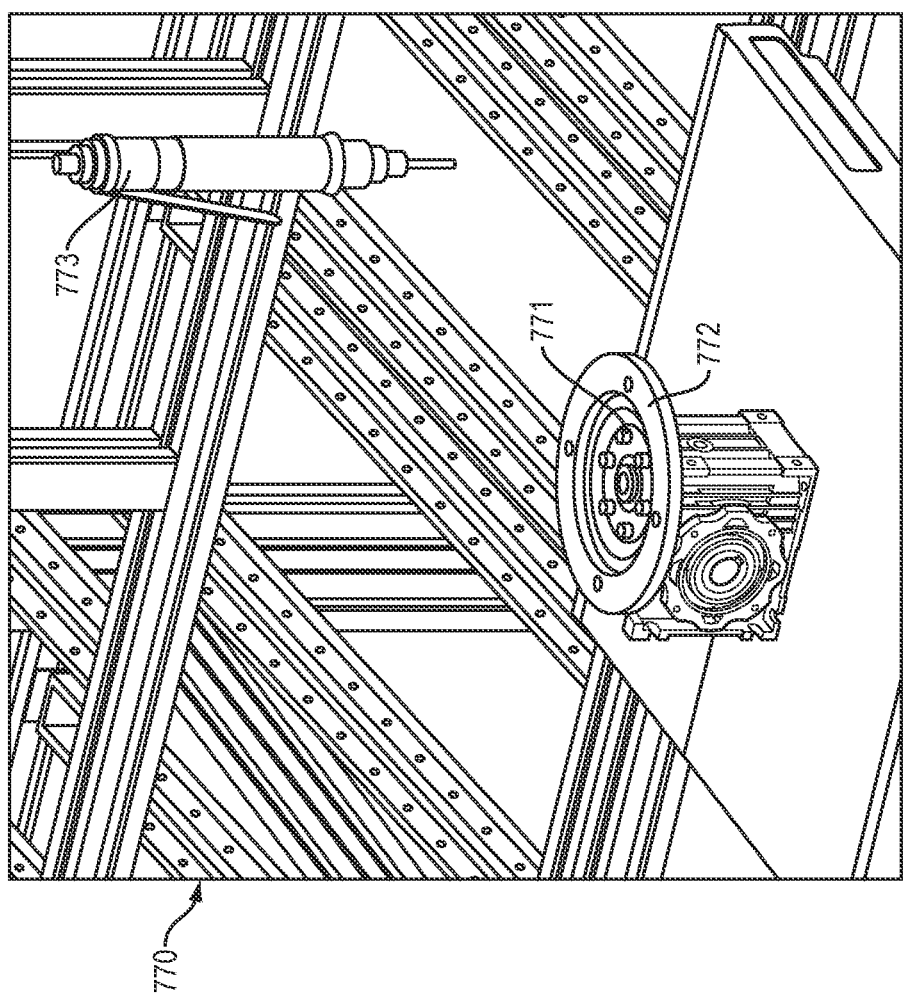

In an example embodiment, after removing invalid phrases, the phrase generator 445 determines if other worker tasks already exist in the operation where the user is creating the new one, so as to orient the appropriate methodology to use. An embodiment check if a worker task and/or phrase already exists for an operation. For instance, if no worker task already exists within an operation, all systems and operations 441 as well as 3D inputs 443 are important to consider. When this occurs, the phrase generator 445 may use the flow 550 described herein below in relation to FIG. 5. However, when a worker task already exists, the phrase to be determined is more likely related to the existing worker task (before and/or after), and, thus, in such an embodiment, the phrase generator 445 uses a mapping between a generated phrase and phrases that should be before and/or after the generated phrase. An example of this mapping between a generated phrase and phrases that are before and after is shown in FIG. 7G in the table 782 of all possible phrases. This decision relies on the manufacturing premises input 448. Manufacturing engineers use strategies to validate the manufacturability of the product. Manufacturing engineers typically start validation where it is more valuable to spend time. For example, such engineers virtually validate the main tasks (usually assembly tasks) before validating storage location tasks. Doing this avoids working on accessory tasks at risk to change due to the product, the sequence, or a resource changing. Indeed, if an assembly task needs to be changed, there is a high chance that the step just before and after will also require change. Thus, an embodiment uses the main working task identified in the manufacturing premise 448, when existing, and uses a before/after logic to define the possible actions 450 to use in the phrase. In an embodiment, action 450 refinement is implemented using operation assignation logic (e.g., decision flow 550) and results in a manufacturing transformation action like screw, drill, etc. being identified. Otherwise, the driving input is the operation assignation logic (e.g., to complete a transformation task, accessory tasks like getting and releasing object are required).

When an operation already has a phrase (in the format of a WT), an embodiment provides a user interface that allows the user to specify where any new task should be added in the sequence, e.g., before or after another WT. In such an embodiment, the phrase determination logic can predict what action to use following an established action order. For example, getting a tool precedes its use and assembling a part follows aligning the part.

Once the action 450 is defined, another logical flow is implemented to determine the what 451. Determining the what 451 considers the assigned 442*a* and surrounding objects 444*a* to adapt the phrase to the context. For example, place a tool back to storage after using it. In some cases, the logic may repeat a task (i.e., same phrase, but using a different part, for example screwing a number of screws).

According to an embodiment, when the phrase is the first of an operation, the phrase determination logic focuses on the presence of the assignations 442*a* first (as What 451 or With or Where 452) rather than the action 450 to perform. This hierarchy respects user intention. For instance, if a user took the time when creating an operation to specify what objects are involved, these assigned 442*a* objects are considered first.

The phrase generator 445 may be configured to prioritize some types of objects over others depending on the manufacturing purpose. For instance, not all object types are equal and some objects are considered accessories to a manufacturing task. These details may be coded in the logic implemented by the phrase generator 445 depending on the manufacturing operations being simulated.

Further, the phrase generator 445 may consider an object to be a mandatory part of the phrase. In a case where the user initiates the worker task creation by positioning an object in the 3D environment, the phrase generator 445 may require this object, which is an active selection 444b, to be in the phrase. In such a case, in replacement of the first filter (in an embodiment where the phrase generator 445 is implementing the method 550), all phrases that are not involving the object positioned by the user, are removed.

As noted above, in an embodiment the phrase generator 445 starts with a list of all valid phrases. Then, the phrase generator 445 applies filters to that list of valid phrases to determine the phrase. FIG. 5 illustrates an example filtering, i.e., hierarchical analysis, method 550 that may be applied to a listing of valid phrase to determine the phrase. Amongst other examples, the method 550 may be utilized at step 102 of the method 100 described hereinabove in relation to FIG. 1 and in the system 440 by the phrase generator 445 described hereinabove in relation to FIG. 4.

The method 550 starts 551 and at step 552 considers if a resource (e.g. tooling) is assigned. Such functionality considers at step 552 if an object, i.e., resource, is assigned to the operation hosting the worker task for which a phrase is being determined. According to an embodiment in a product manufacturing context, a resource is any object that is not the object/product being manufactured. Further, in an embodiment, an indication of a resource or data related thereto, may be stored in a distinct data structure from data related regarding the objecting being developed. If step 552 determines that a resource is assigned to the operation, the method 550 moves to step 553 and otherwise, the method 550 moves to step 554.

At step 554, the method 550 considers if there is a previous assembly involved in the operation and if there is a previous assembly, the method 550 moves to step 555 and, otherwise, moves to step 556. Step 554 considers if, at the operation hosting the worker task to be created, an assembly exists as buildup output of a previous operation. In other words, step 554 considers if there is an existing assembly from a previous operation or task that is related to the current operation for which the phrase is being generated. For example, if a previous operation involved putting a tire on a wheel and the current operation involves installing the tire/wheel assembly on a car, the tire and wheel would have been considered provided objects when a phrase for putting the tire on the wheel was determined, and at step 554 when the tire/wheel combination is being installed on the car the method 550 would determine that there is a previous assembly, the tire/wheel combination.

Step 555 considers if a provided object (i.e., a new part) is assigned to the operation. Step 555 thus evaluates if a new object is assigned for implementing the buildup of the operation hosting the worker task to be created. Returning to the wheel/tire assembly example, if a nut is needed to install the tire/wheel assembly on the car, step 555 would determine that an object, the nut, is assigned to the operation. If there is a provided object assigned, the method 550 is in scenario 6, where the task involves an assembly and a provided object. In scenario 6 all phrases including a resource or not including an assembly or not including a provided are rejected. If a provided object is not assigned, the method 550 is in scenario 2 where only an assembly is involved in the task. Thus, in scenario 6 all phrases including a resource or not including assembly are rejected.

Returning to step 556, the method 550 considers if a provided object is assigned. If, at step 556, the method 550 determines a provided object is assigned to the operation that includes the worker task to be created, the method 550 is in scenario 1 where only a provided object is assigned to the task. In scenario 1 all phrases including a resource or an assembly or not including a provided are rejected. If, at step 556, the method 550 determines that a provided object is not assigned to the operation including the worker task to be created (the task for which a phrase is being determine), the method 550 moves to step 557 which looks for an object involved in a what-with/where list, i.e., a list of candidate objects to be a What 451 or With or Where item 452 constituted of assigned and surrounding objects). An example what-with/where list 781 is shown in FIG. 7F. After looking for the object in the what-with/where list at step 557, at step 558, the method 550 considers if an object is listed in the what-with/where list of the worker task to be created, but is not an assigned resource to the worker task parent operation. If step 558 determines there is an object listed in the what-with/where list, but assigned to the parent operation, the method 550 moves to step 559 and if step 558 determines there is not an object listed in the what-with/where list, the method 550 is in scenario 8. Scenario 8 is an "Else" case, i.e. scenario 8 identifies a phrase to use when none of the other use cases apply. For instance, the phrase for scenario 8 could be "No action," since there is no assembly, no provided, and no valid resource assigned or surrounding.

If the method 550 reaches step 559, it means that only unassigned resources (no provided and no assembly) are available for the phrase. Step 559 considers if there is more than one resource available. If there is not more than one resource, the method 550 is in scenario 3.1. In scenario 3.1 the possible phrases are limited to phrases including the unique available resource, and phrases that include an assembly and provided object are filter out, i.e., eliminated. If there is more than one resource, the method 550 moves to step 560.

Returning to step 552, where it is determined that a resource is assigned to the operation that includes the worker task to be created and for which the phrase is being determined, the method 550 moves to step 553. Step 553 considers if a provided object is also assigned to the operation. If step 553 determines a provided object is assigned, the method 550 moves to step 561. If step 553 determines a provided object is not assigned, the method 550 moves to step 562.

At step 561, the method 550 considers if there is no an assembly and also considers if there is a specific hand tool (e.g., nut runner, reaction bar, rivet runner, screwdriver, power screwdriver, torque wrench, tweezers) assigned to the operation hosting the worker task to be created. If there is no assembly, but a hand tool is assigned, the method 550 is in scenario 4.1. Scenario 4.1 is reached in cases where the data does not provide a 3D object for fastening/interaction and there is no assembly, but there is a hand tool. When this occurs, the possible phrases include the specified resource, e.g., the hand tool, and the with or where 452, or the what 451 elements of the phrase are replaced by "virtual fasteners." An example suggested phrase may be "Tighten virtual fastener with torque wrench." If step 561 determines that an assembly is assigned, the method 550 is in scenario 4.2. In scenario 4.2 all phrases that do not include a resource and a provided object are rejected.

Returning to step 553, when the method 550 determines a provided object is not assigned, the method 550 moves to step 562. Step 562 considers if there is a previous assembly assigned to the task. If there is a previous assembly, the method 550 is in scenario 5. In scenario 5 the possible phrases are limited to phrases including a resource and an assembly, and phrases that include a provided are filtered out. If step 562 determines there is not a previous assembly, the method 550 moves to step 563.

Step 563 considers if there is more than one resource assigned to the task. If there is not more than one resource, the method 550 is in scenario 3.1. In scenario 3.1 the possible phrases will be limited to phrases including the unique resource, and phrases that include other resources or an assembly or a provided are eliminated. If step 563 determines there is more than one resource, the method 550 moves to step 560.

Step 560 considers if there is a match in scenario 3.2. This means one or more combination of available resources match phrase(s) from the possible phrase table. Other phrases are rejected. If there is a match in scenario 3.2, the method 550 is in scenario 3.2 and otherwise, the method 550 is in scenario 3.1.

Figure 5:
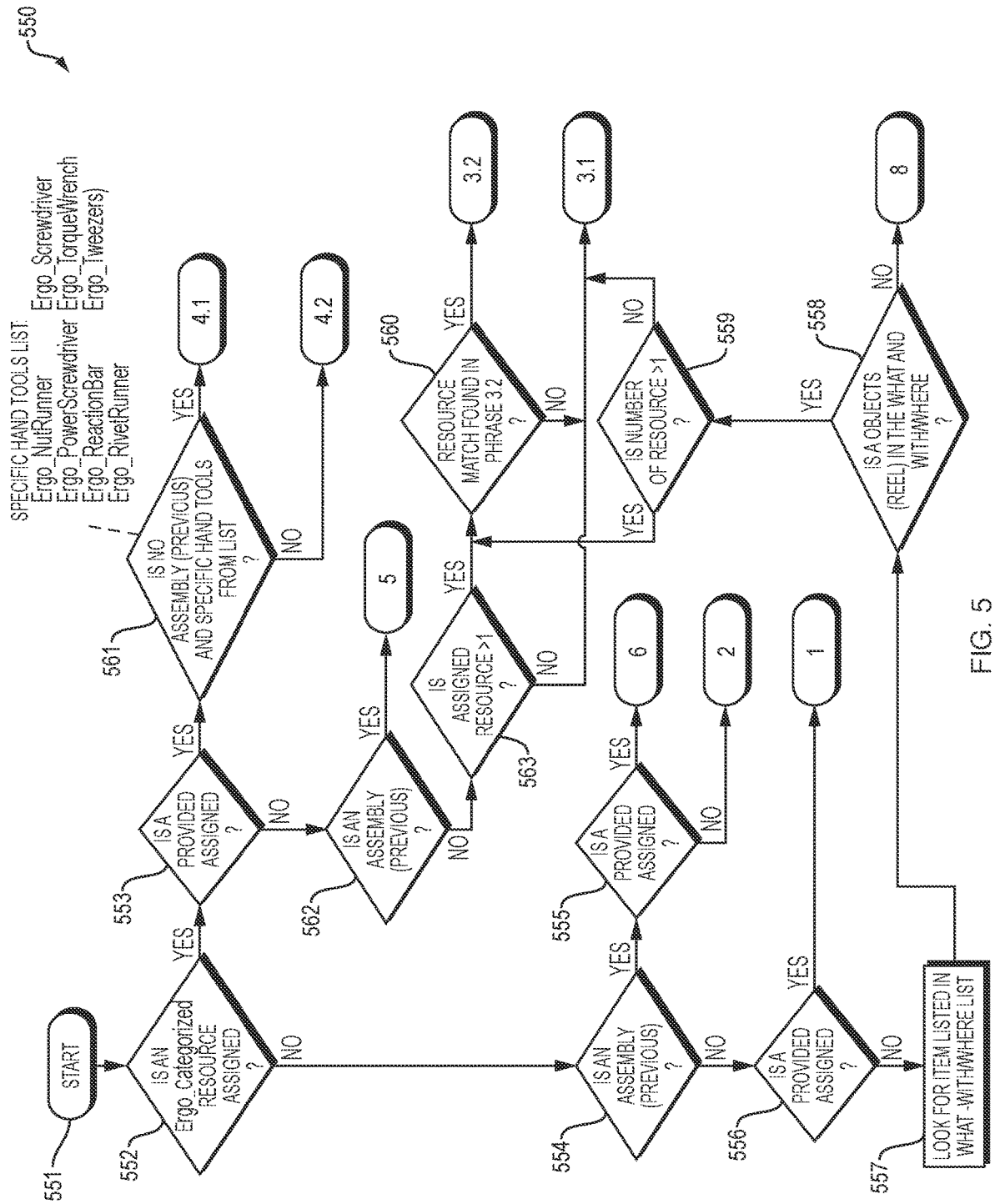
FIG. 5 is a flow diagram of a phrase filtering method that may be implemented by embodiments.

It is noted that FIG. 5 shows but one example hierarchical analysis method 550 that may be utilized in embodiments. Embodiments may implement any desired hierarchical analysis logic that is tailored to the environments being simulated. Further, it is noted that the method 550 may be used to generate a first phrase for an operation. Then, if a user wants to determine phrases for other tasks that are part of the operation, a mapping, e.g., as shown in the table 782 of FIG. 7G, between a generated phrase (e.g., generated using the method 550) and phrases that occur before and after the generated phrase are used. For example, in such an embodiment, the phrase generated using the method 550 (parts of which are in columns A-D) is looked up in the table 782 and the additional phrases that are before and after the generated phrase are indicated in columns J-M and N-Q, respectively. As such, the table 782 includes a mapping between a generated phrase (shown in columns A-D) and a phrase that occurs before (shown in columns J-M) and a phrase that occurs after (shown in columns N-Q). It is noted that the table 782 illustrates but a portion of one example phrase table that may be used in embodiments and various tables may be utilized that are particular to user desired functionality and the applications and contexts for which embodiments are being implemented.

As noted above, in embodiments, e.g., the system 440, after determining a valid phrase, the phrase is used to determine inputs, e.g., grasp target 453, vision target 454, and vision acuity 455, for a posturing engine, e.g., posturing engine 446. Determining the posture engine inputs from the phrase, according to an embodiment, includes identifying the object to interact with. In an embodiment, the object to interact with is called the grasp targeted object. The grasp target object is not necessarily the "what" item of the phrase. For example, in the phrase "Get the assembly from rack", the "What" item is the "Assembly", which is the targeted object. However, in the phrase Get the assembly with a lift assist, the "What" is still the object to "Get." However, since the get is done by the lift assist, the manikin will interact with the "With" (lift assist). An embodiment identifies the object to interact with using a set of targeted object rules. The target object rules are mapping between phrase elements and target objects. Specifically, the rules indicate the particular target object given particular phrases or characteristics of phrases. In an example embodiment the rules indicate that if the phrase has a "with" preposition and the With or Where 452 is a resource, the targeted object is the With or Where 452 object of the phrase and, else, the targeted object is the What 451 object.

In a similar way to the grasp targeted object definition, the phrase is used to define the vision target. However, the challenge is different. The vision target may be different from the grasping target. For example, when grabbing an assembly with a lifting device, the grasp target is the lifting device handle, but the vision target is the assembly. Embodiments use rules/mapping that embody logic that uses the elements of the phrase, with an emphasis on the action and the preposition, to define the vision target.

Further, an embodiment defines a more accurate location in relation to the vision target. This precision is influenced by the action to be performed in the simulation. For example, getting a hand tool, like a power screwdriver, requires looking at the tool in general. However, using the hand tool requires looking at the tip of the tool. In another example, carrying the power screwdriver does not require looking at it. Embodiments can utilize a mapping that considers these nuances and appropriately determines the vision target given the task A worker task can be a task where each hand is doing a different task. For example, a task can include the left hand picking up bolts from a bin while the right hand gets a screwdriver. In an embodiment, two phrases are identified for tasks where each hand is doing something different. To avoid conflict when two phrases are defined for looking at different targets, another logic is applied to prioritize the most important hand action. An example of this logic is shown in the table 660 of FIG. 6. In the example table 660, column 661 indicates the tasks a left hand is doing, e.g., aligning, assembling, bending etc., and the row 662 indicates the tasks a right hand is going, e.g., aligning, assembling, bending, etc. The intersections of the column 661 and row 662 indicate the most important hand action and the vision priority. For instance, if the left hand action is connecting 663 and the right hand action is cleaning 664, the prioritized task is the connecting 665. It is noted that the table 660 illustrates but one example prioritization logic that may be used in embodiments and any variety of prioritization schemes can be utilized that are particular to user desired functionality and the applications and contexts for which embodiments are being implemented.

Once the vision target is defined, an embodiment also determines vision acuity. Orienting the manikin line of sight on the visual target optimizes the eye to distinguish color and shape. However, it can create an ergonomically undesirable posture. In an embodiment, the posturing engine considers required vision acuity in determining the posture. Thus, an embodiment also determines a vision acuity as a posture engine input. An example embodiment uses three different levels of vision acuity, precision, in field of view, and not required. Further, an embodiment determines the vision acuity based on what acuity is needed to perform the action in the phrase. In the example of a getting a power screwdriver, this task requires a within field of view while in the example of using a power screwdriver, a precision view acuity level is needed.

FIGS. 7A-G illustrate steps of using an embodiment to posture a manikin.

The example illustrated in FIGS. 7A-G involves simulating a task of an operation, where a part, bolt 771, is assigned to the operation to be added to the product 772. In this example, a power screwdriver 773 is within the working environment 770.

An embodiment checks several rules and then adds object(s) to a list of candidate items for the phrase. First, such an embodiment determines if the operation inherits a part or an assembly from a previous operation. FIG. 7B shows that the part 772 in the environment 770 is inherited from a previous operation.

Figure 7C:
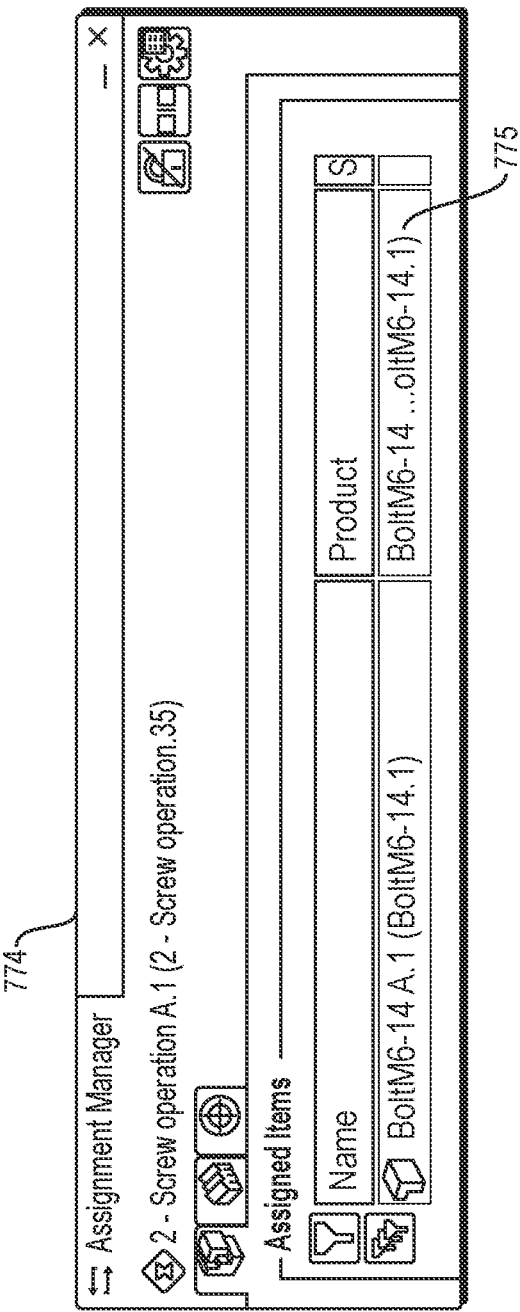
Figure 7D:
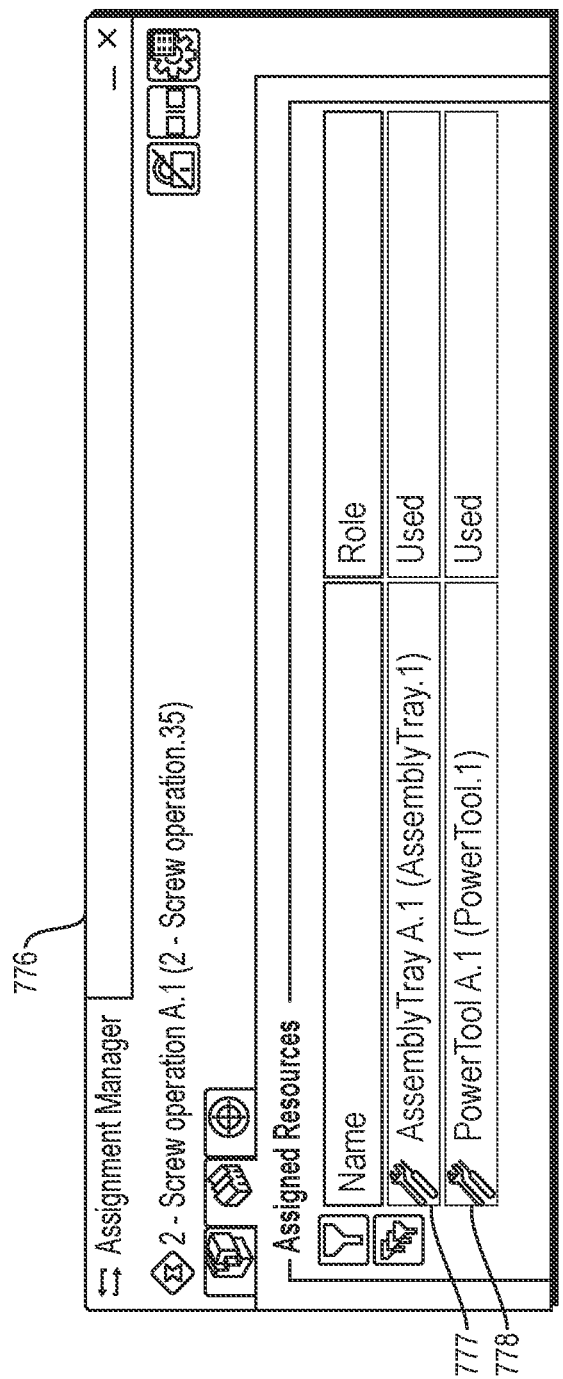
Figure 7E:
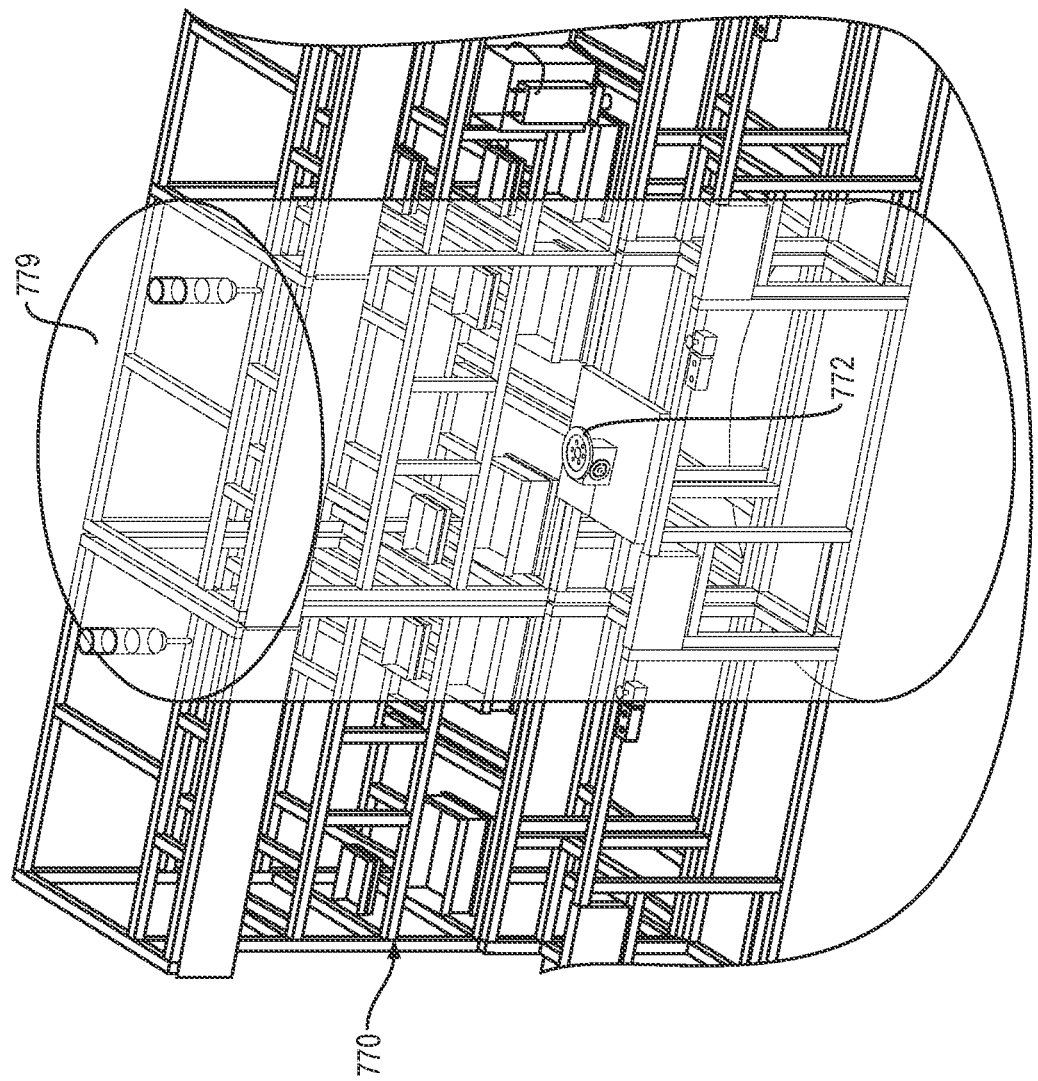
Figure 7F:
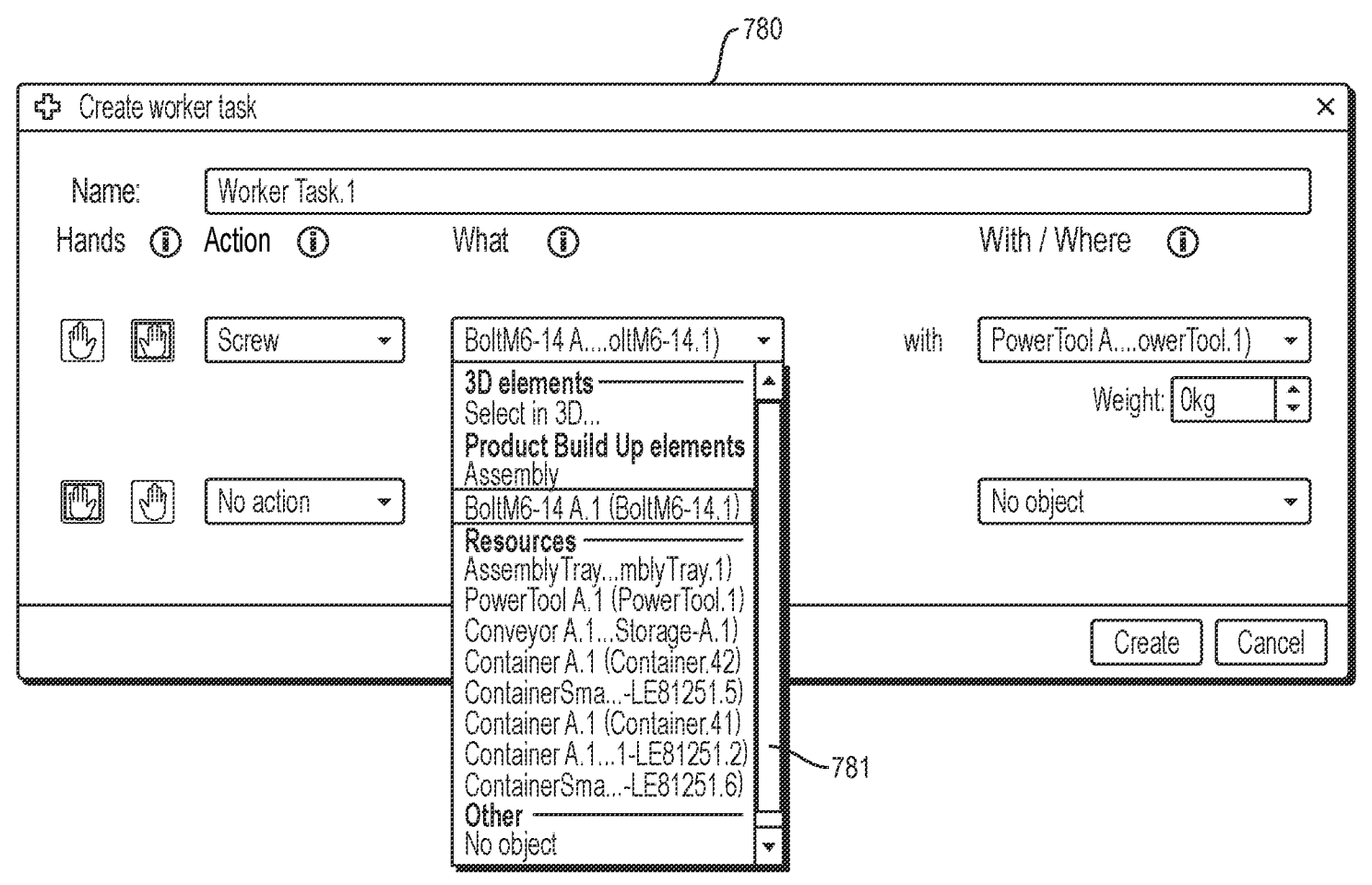

Next, the embodiment analyzes data regarding the operation and determines the operation involves providing a new part 771. In this case, BoltM6-14 771 is assigned to the task and, as such, the task is considered to include providing a new part. This is determined in an embodiment by examining process planning data. The interface 774 in FIG. 7C is an example user interface 774 that embodies the process planning data where the bolt 771 assignment 775 is shown.

To continue, the embodiment considers if the concerned operation is providing (resource assignations) objects from a resource tree. In the present use case, as shown in the interface 776 of FIG. 7D, an assembly tray 777 and the power tool 778 are assigned to the task. In this example embodiment, if the resource object is not identified by a relevant category, it is not added to the candidate list of words for the phrase.

The embodiment also considers any surrounding resources in collision with a vertical cylinder 779 (shown in FIG. 7E) centered at the operation position (if defined), else around resource position (if defined). According to an embodiment, an operation position is a user declared position of the product buildup to be applied when the operation is selected. A resource position is similar to an operation position, but a resource position is applied on an assigned resource. In this example, as shown in the environment 770 in FIG. 7E, the vertical cylinder 779 is defined around the center of the product buildup 772. Once again, if the resource object is not identified by a relevant category, it is not added to the candidate list.

After performing the foregoing checks described in relation to FIGS. 7A-E, a list of candidate phrase words is developed. FIG. 7F shows an example candidate list 781 in the interface 780. The list 781 can be provided to a user for modifying the phrase manually, but, in this example, it is first used by the system to determine the task to be executed by the manikin.

The example illustrated using FIGS. 7A-G relies on a table of all possible phrases. In this example, the table (of which an example portion 782 is shown in FIG. 8G) includes 667 phrases. Each phrase is composed of an "action verb", a "what" object, a "preposition," and a "with or where" object. This table 782 format enables expansion to add more phrases as needed depending on the application of embodiments, e.g., industries to cover, or purpose, such as manufacturing, maintenance, etc., for which embodiments are being utilized.

In this example, the list of candidate phrase components is used to filter the table 782 to only valid phrases. After this, such an embodiment filters the table 782 to include a minimal quantity of phrases. In this example, a filtering method, e.g., the method 550, is used to filter the table. Embodiments can use different strategies for filtering depending upon the presence or absence of an object's category within the list of candidate items. In an embodiment the phrases resulting from the filtering process are then prioritized per resource category. A phrase utilizing a hand tool is prioritized over one utilizing an industrial device. According to an embodiment, the priority order from the highest priority to the lowest is as follows: hand tool, industrial device, logistics, storage, furniture, computer equipment, and others.

First, an embodiment categorizes the candidate phrase objects in three types: provided (a new part implemented by the operation), assembly (the result of the previous operation), and resources (objects needed to manufacture the product). Second, the embodiment classifies the items defined as a resource, into sub categories: hand tool, industrial device (such as lift assistant, machine, robot, jig, etc.), logistics (conveyor, automated guided vehicle, cart), storage, and furniture. Validating a manikin interacting with a hand tool has more value than with a furniture. Third, the hierarchical analysis guides the table reduction as a function of the candidate item possible combinations according to the following combination order (deducted from manufacturing premises): (1) high value assigned resource and provided object, (2) high value resource in proximity and provided object, (3) high value assigned resource and assembly, (4) high value resource in proximity and assembly, (5) provided object and assembly, (6) assembly only, (7) provided object only, (8) lower value resource (assigned or not), etc.

In the example of FIGS. 7A-G the power screwdriver 773 is a high value resource. Thus, all phrases that do not have a power screwdriver in the "What" or in the "With or Where" are removed. The concerned operation provides a new part (bolt 771) to be assembled. This combination (high value assigned resource (screwdriver 773) and provided new object (bolt 771)) leads to the removal of all the remaining phrases that do not include a "Provided" item. The leaves such an embodiment with the phrases shown below in Table 1.

TABLE 1

| Screw | Provided | with | Ergo__PowerScrewdriver |
| Tighten | Provided | with | Ergo__PowerScrewdriver |
| Unscrew | Provided | with | Ergo__PowerScrewdriver |

After obtaining the candidate phrases in Table 1, another filter based on the action verb is applied. The example illustrated across FIGS. 7A-G relates to manufacturing and, thus, in this manufacturing domain the main action determination prioritizes actions of assembling over disassembling. In this example, the action "screw" is prioritized over "Tighten" since the tool is a screwdriver. Tighten would have been prioritized if the tool was a nut runner. This filter yields the candidate phrase shown below in Table 2.

TABLE 2

| Screw | Provided | with | Ergo__PowerScrewdriver |

In turn, the example of FIGS. 7A-G continues and determines the posture engine inputs using a mapping between the phrase in Table 2 and the posture engine inputs. In this example, there are posture engine inputs associated to that specific line in the phrase table 782 and the system sends the input to the posturing engine. Here, the power screwdriver is sent as the hand target object, the tool tip is sent as the vision target, and within field of view is sent as the vision accuracy needed.

Embodiments have numerous advantages compared to existing posture determination techniques. Embodiments, through the development and use of the phrase, are significantly more efficient. Further, embodiments can also be leveraged for automatic object positioning. With the addition of more 3D object characteristics, embodiments can determine position automatically for an object mentioned in the phrase. For example, if the phrase is "get bolt from bin," an embodiment can set that the bolt is automatically moved into the bin so the user does not have to position the bolt. Such functionality combined with embodiments and posturing engines, significantly reduces the manual work required by users and allows users to easily assess ergonomics.

Combined with the Smart Posturing Engine™ (SPE™) technology (4, 5, 6), which generates posture automatically in a 3D environment, Ergo4All™ technology (7) analyses the potential risk of developing musculoskeletal disorder (MSD) by workers. Embodiments provide guidance to user on changes to environments, e.g., workstations, that will lower ergonomic risks. Further, embodiments can provide inputs to the posturing engine and allow the user to assess ergonomics in one click.

Advantageously, embodiments reuse process planning information. During an engineering phase, before an ergonomics assessment, engineers define the operations, assign the parts and resources to those operations, and set the flow between operations, in order to do product build-up review and line balancing. Since this information already exists, it can be used by embodiments to predict the user intention regarding ergonomics and consequently reduce the workload.

Further, embodiments speed up manikin posturing. Embodiments generate a simple and logical phrase to determine the manikin task posture automatically. This avoids having to manually specify where the hands, the feet, and the vision for a manikin in a simulation should be.

Embodiments also standardize results between users. By using embodiments to determine the manikin posture, the posture is not subject to individual interpretation. Thus, the resulting ergonomic assessment or other such simulation results generated using embodiments is not user dependent.

Unlike existing methods, embodiments provide functionality to automatically generate a phrase based upon environment data. In contrast, existing methods require a user to select elements via a series of menus. Embodiments provide a unique method that automatically uses process planning data to determine manikin posture. Advantageously embodiments automatically determine the inputs for a posture engine.

Computer Support

FIG. 8 is a simplified block diagram of a computer-based system 880 that may be used to determine position of a manikin according to any variety of the embodiments of the present invention described herein. The system 880 comprises a bus 883. The bus 883 serves as an interconnect between the various components of the system 880. Connected to the bus 883 is an input/output device interface 886 for connecting various input and output devices such as a keyboard, mouse, display, speakers, etc. to the system 880. A central processing unit (CPU) 882 is connected to the bus 883 and provides for the execution of computer instructions. Memory 885 provides volatile storage for data used for carrying out computer instructions. In particular, memory 885 and storage 884 hold computer instructions and data (databases, tables, etc.) for carrying out methods 100, 440, 550 of FIGS. 1, 4, and 5 and supporting corresponding user interfaces described above. Storage 884 provides non-volatile storage for software instructions, such as an operating system (not shown). The system 880 also comprises a network interface 881 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 880, or a computer network environment such as the computer environment 990, described herein below in relation to FIG. 9. The computer system 880 may be transformed into the machines that execute the methods (e.g., 100, 440, 550) and techniques described herein, for example, by loading software instructions into either memory 885 or non-volatile storage 884 for execution by the CPU 882. One of ordinary skill in the art should further understand that the system 880 and its various components may be configured to carry out any embodiments or combination of embodiments of the present invention described herein. Further, the system 880 may implement the various embodiments described herein utilizing any combination of hardware, software, and firmware modules operatively coupled, internally, or externally, to the system 880.

Figure 9:
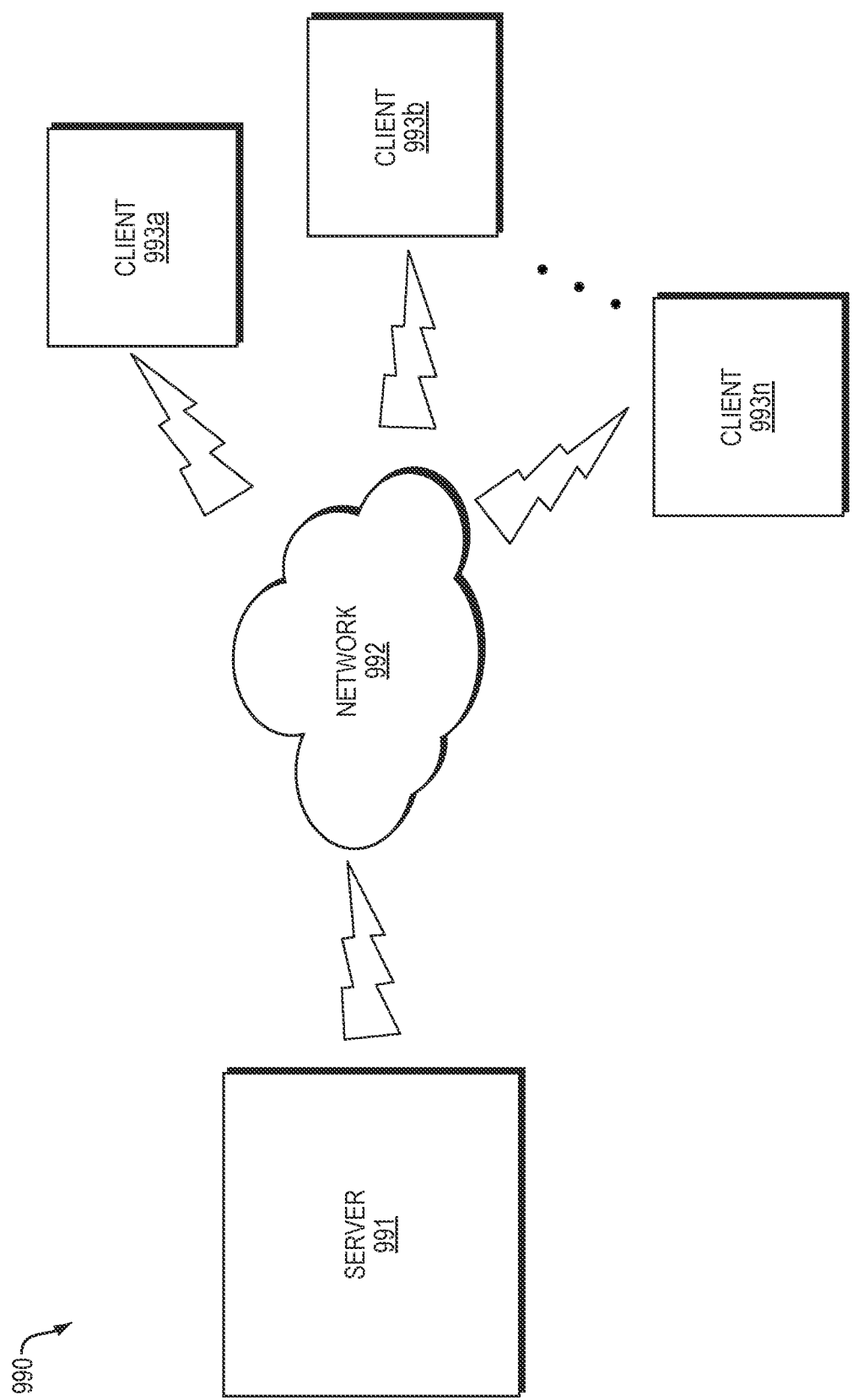
FIG. 9 is a simplified diagram of a computer network environment in which an embodiment of the present invention may be implemented.

FIG. 9 illustrates a computer network environment 990 in which an embodiment of the present invention may be implemented. In the computer network environment 990, the server 991 is linked through the communications network 992 to the clients 993a-n. The environment 990 may be used to allow the clients 993a-n, alone or in combination with the server 991, to execute any of the embodiments described herein. For non-limiting example, computer network environment 990 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

REFERENCES (1) Cort J A, Devries D. Accuracy of Postures Predicted Using a Digital Human Model During Four Manual Exertion Tasks, and Implications for Ergonomic Assessments. IISE Transactions on Occupational Ergonomics and Human Factors. 2019; 7(1):43-58.
(2) Hanson L, Högberg D, Carlson J S, Bohlin R, Brolin E, Delfs N, et al. IMMA-Intelligently moving manikins in automotive applications. Third International Summit on Human Simulation (ISHS2014)2014.
(3) Baerlocher, P. Inverse kinematics techniques for the interactive posture control of articulated figures [Ph. D. thesis]. Ecole Polytechnique Federale de Lausanne (EPFL)Stephens A, Jones M. Workplace methods and use of digital human models. Handbook of DIGITAL HUMAN MODELING, USA: Taylor and Francis. 2009: 6.1-6.11.
(4) Lemieux P-O, Barré A, Hagemeister N, Aissaoui R. Degrees of freedom coupling adapted to the upper limb of a digital human model. International Journal of Human Factors Modelling and Simulation. 2017; 5(4):314-37.
(5) Lemieux P, Cauffiez M, Barré A, Hagemeister N, Aissaoui R. A visual acuity constraint for digital human modeling. Conference proceedings 4th. 2016.
(6) Zeighami A, Lemieux P, Charland J, Hagemeister N, Aissaoui A. Stepping behavior for stability control of a digital human model. ISB/ASB. 2019.
(7) Bourret Q, Charland J, Imbeau D, Brouillette D, Djire J-B. Ergo4All: An Ergonomic Guidance Tool for Non-ergonomist. N. L. Black et al. (Eds.): IEA 2021, LNNS 221, pp. 382-390, 2021.
(8) Perez, J. and Neumann, W. P. (2015). Ergonomists' and Engineers' views on the utility of virtual Human Factors Tools. Human Factors and Ergonomics in Manufacturing & Service Industries, 25(3), 279-293.

What is claimed is:

1. A computer-implemented method of automatically determining a posture for a manikin in a computational simulation of a real-world environment by automatically determining posture engine inputs, the method comprising, by a processor:
receiving, in memory of the processor, environment data;
automatically generating a phrase by: (i) determining candidate phrases based on the environment data and (ii) hierarchically filtering the candidate phrases based on the environment data to generate the phrase, wherein the generated phrase describes a task, to be simulated, performed by a manikin in an environment;
automatically determining one or more posture engine inputs based on the generated phrase by searching a mapping, between respective posture engine inputs and respective phrase components, using components of the generated phrase, wherein results of the searching indicate the one or more posture engine inputs; and
based on the determined one or more posture engine inputs, automatically determining a posture for the manikin in a virtual representation of the environment, in a computational simulation of the manikin performing the task in the environment.

2. The method of claim 1 wherein the environment data includes at least one of: one or more operations; a sequence of tasks comprising an operation; one or more parts assigned to an operation; one or more resources assigned to an operation; a sequence of operations; one or more objects in the environment; position of the one or more objects in the environment; context of the task; and task validation premises.

3. The method of claim 1 wherein the phrase is comprised of: (i) a verb component indicating an action of the task, (ii) a what component indicating what the verb component pertains to, (iii) a preposition component, and (iv) a with or where component indicating an object used for the action or where the action is performed.

4. The method of claim 1 wherein hierarchically filtering the candidate phrases comprises:
first, eliminating invalid phrases from the determined candidate phrases; and
second, eliminating phrases that include an invalid interaction object.

5. The method of claim 1 further comprising:
prior to determining the one or more posture engine inputs, receiving an indication of user approval of the phrase.

6. The method of claim 1 wherein the one or more posture engine inputs include at least one of: grasp target, vision target, vision acuity for the manikin performing the task, and an indication if object weight is considered.

7. The method of claim 1 wherein automatically determining the posture comprises:
providing the determined posture engine inputs to a processor-implemented posturing engine configured to determine the posture based upon the provided posture engine inputs; and
receiving the posture from the posturing engine.

8. The method of claim 1 further comprising:
simulating the manikin performing the task in the environment using the determined posture.

9. The method of claim 8 further comprising:
determining a change to a workstation for the manikin performing the task based on results of the simulating.

10. A system for automatically determining a posture for a manikin in a computational simulation of a real-world environment by automatically determining posture engine inputs, the system comprising:
a processor; and
a memory with computer code instructions stored thereon, the processor and the memory, with the computer code instructions, being configured to cause the system to:
receive environment data;
automatically generate a phrase by: (i) determining candidate phrases based on the environment data and (ii) hierarchically filtering the candidate phrases based on the environment data to generate the phrase, wherein the generated phrase describes a task, to be simulated, performed by a manikin in an environment;
automatically determine one or more posture engine inputs based on the generated phrase by searching a mapping, between respective posture engine inputs and respective phrase components, using components of the generated phrase, wherein results of the searching indicate the one or more posture engine inputs; and
based on the determined one or more posture engine inputs, automatically determine a posture for the manikin in a virtual representation of the environment, in a computational simulation of the manikin performing the task in the environment.

11. The system of claim 10 wherein the phrase is comprised of: (i) a verb component indicating an action of the task, (ii) a what component indicating what the verb component pertains to, (iii) a preposition component, and (iv) a with or where component indicating an object used for the action or where the action is performed.

12. The system of claim 10 wherein, in hierarchically filtering the candidate phrases, the processor and the memory, with the computer code instructions, are further configured to cause the system to:
first, eliminate invalid phrases from the determined candidate phrases; and
second, eliminate phrases that include an invalid interaction object.

13. The system of claim 10 wherein the processor and the memory, with the computer code instructions, are further configured to cause the system to:
prior to determining the one or more posture engine inputs, receive an indication of user approval of the phrase.

14. The system of claim 10 wherein, in automatically determining the posture, the processor and the memory, with the computer code instructions, are further configured to cause the system to:
implement a posturing engine configured to determine postures based upon posture engine inputs;
provide the determined posture engine inputs to the posturing engine; and
receive the posture from the posturing engine.

15. A non-transitory computer program product for automatically determining a posture for a manikin in a computational simulation of a real-world environment by automatically determining posture engine inputs, the computer program product executed by a server in communication across a network with one or more clients and comprising:
a computer readable medium, the computer readable medium comprising program instructions which, when executed by a processor, causes the processor to:
receive environment data;
automatically generate a phrase by: (i) determining candidate phrases based on the environment data and (ii) hierarchically filtering the candidate phrases based on the environment data to generate the phrase, wherein the generated phrase describes a task, to be simulated, performed by a manikin in an environment;
automatically determine one or more posture engine inputs based on the generated phrase by searching a mapping, between respective posture engine inputs and respective phrase components, using components of the generated phrase, wherein results of the searching indicate the one or more posture engine inputs; and
based on the determined one or more posture engine inputs, automatically determine a posture for the manikin in a virtual representation of the environment, in a computational simulation of the manikin performing the task in the environment.

* * * * *